(12) United States Patent
Barrell et al.

(10) Patent No.: US 8,930,619 B2
(45) Date of Patent: Jan. 6, 2015

(54) METHOD AND APPARATUS FOR EFFICIENTLY DESTAGING SEQUENTIAL I/O STREAMS

(71) Applicant: Dot Hill Systems Corporation, Longmont, CO (US)

(72) Inventors: Michael David Barrell, Superior, CO (US); Zachary David Traut, Denver, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 0 days.

(21) Appl. No.: 14/465,291

(22) Filed: Aug. 21, 2014

(65) Prior Publication Data
US 2014/0365725 A1   Dec. 11, 2014

Related U.S. Application Data

(63) Continuation-in-part of application No. 13/482,314, filed on May 29, 2012.

(51) Int. Cl.
*G06F 12/00* (2006.01)
*G06F 3/06* (2006.01)
*G06F 12/08* (2006.01)

(52) U.S. Cl.
CPC ............ *G06F 3/0689* (2013.01); *G06F 3/0604* (2013.01); *G06F 3/0646* (2013.01); *G06F 12/0866* (2013.01)
USPC ............ 711/113; 711/135; 711/103; 711/144

(58) Field of Classification Search
CPC ............ G06F 12/0868; G06F 12/0866; G06F 12/0817; G06F 12/0873; G06F 3/0683; G06F 3/0631; G06F 2212/312
USPC .................................................. 711/113, 135
See application file for complete search history.

(56) References Cited

U.S. PATENT DOCUMENTS

| | | |
|---|---|---|
| 5,381,528 A | 1/1995 | Brunelle |
| 5,410,653 A | 4/1995 | Macon, Jr. et al. |
| 5,522,054 A | 5/1996 | Gunlock et al. |
| 5,557,767 A | 9/1996 | Sukegowa |
| 5,600,817 A | 2/1997 | Macon, Jr. et al. |
| 5,619,723 A | 4/1997 | Jones et al. |

(Continued)

OTHER PUBLICATIONS

Notice of Allowance dated Oct. 7, 2014 for U.S. Appl. No. 13/482,314.

*Primary Examiner* — Reginald Bragdon
*Assistant Examiner* — Hannah A Faye-Johnson
(74) *Attorney, Agent, or Firm* — Thomas J. Lavan

(57) ABSTRACT

A method for destaging write data from a storage controller to storage devices is provided. The method includes determining that a cache element should be transferred from a write cache of the storage controller to the storage devices, calculating that a dirty watermark is above a dirty watermark maximum value, identifying a first cache element to destage from the write cache to the storage devices, transferring a first data container including the first cache element to the storage devices, and incrementing an active destage count. The method also includes repeating determining, calculating, identifying, transferring, and incrementing if the active destage count is less than an active destage count maximum value. The active destage count is a current number of write requests issued to a virtual disk that have not yet been completed, and the virtual disk is a RAID group comprising one or more specific storage devices.

20 Claims, 15 Drawing Sheets

(56) References Cited

U.S. PATENT DOCUMENTS

| | | | | |
|---|---|---|---|---|
| 5,640,530 | A * | 6/1997 | Beardsley et al. | 711/113 |
| 5,680,573 | A | 10/1997 | Rubin et al. | |
| 5,687,389 | A | 11/1997 | Packer | |
| 5,809,560 | A | 9/1998 | Schneider | |
| 6,047,359 | A | 4/2000 | Fouts | |
| 6,070,230 | A | 5/2000 | Capps | |
| 6,092,141 | A | 7/2000 | Lange | |
| 6,092,149 | A | 7/2000 | Hicken et al. | |
| 6,108,764 | A * | 8/2000 | Baumgartner et al. | 712/28 |
| 6,195,727 | B1 | 2/2001 | Islam et al. | |
| 6,226,713 | B1 | 5/2001 | Mehotra | |
| 6,249,804 | B1 | 6/2001 | Lam | |
| 6,286,080 | B1 | 9/2001 | Galbraith et al. | |
| 6,321,300 | B1 | 11/2001 | Ornes et al. | |
| 6,338,115 | B1 | 1/2002 | Galbraith et al. | |
| 6,349,326 | B1 | 2/2002 | Lam | |
| 6,505,268 | B1 | 1/2003 | Schultz et al. | |
| 6,523,086 | B1 | 2/2003 | Lee | |
| 6,549,977 | B1 | 4/2003 | Horst et al. | |
| 6,567,892 | B1 | 5/2003 | Horst et al. | |
| 6,701,413 | B2 | 3/2004 | Shirai et al. | |
| 6,775,794 | B1 | 8/2004 | Horst et al. | |
| 6,785,771 | B2 * | 8/2004 | Ash et al. | 711/136 |
| 6,789,171 | B2 | 9/2004 | Desai et al. | |
| 6,842,792 | B2 | 1/2005 | Johnson et al. | |
| 6,877,065 | B2 | 4/2005 | Galbraith et al. | |
| 6,910,099 | B1 | 6/2005 | Wang et al. | |
| 6,915,404 | B1 | 7/2005 | Desai et al. | |
| 6,931,486 | B2 | 8/2005 | Cavallo et al. | |
| 6,965,966 | B1 | 11/2005 | Rothberg et al. | |
| 7,069,354 | B2 | 6/2006 | Pooni et al. | |
| 7,080,208 | B2 * | 7/2006 | Ashmore et al. | 711/136 |
| 7,120,753 | B2 | 10/2006 | Accapadi et al. | |
| 7,146,467 | B2 | 12/2006 | Beardon et al. | |
| 7,216,203 | B1 | 5/2007 | Bagewadi | |
| 7,260,679 | B2 * | 8/2007 | Benhase et al. | 711/113 |
| 7,302,530 | B2 | 11/2007 | Barrick et al. | |
| 7,318,142 | B2 | 1/2008 | Accapadi et al. | |
| 7,337,262 | B2 | 2/2008 | Beeston et al. | |
| 7,493,450 | B2 | 2/2009 | Beardon | |
| 7,523,259 | B2 | 4/2009 | Pistoulet | |
| 7,543,124 | B1 | 6/2009 | Accapadi et al. | |
| 7,627,714 | B2 * | 12/2009 | Ash et al. | 711/113 |
| 7,664,785 | B2 * | 2/2010 | Kano | 707/654 |
| 7,721,043 | B2 * | 5/2010 | Gill et al. | 711/113 |
| 7,724,568 | B2 | 5/2010 | Arya et al. | |
| 7,853,751 | B2 | 12/2010 | Manoj | |
| 7,996,623 | B2 | 8/2011 | Walker | |
| 8,074,020 | B2 | 12/2011 | Seaman et al. | |
| 8,255,627 | B2 * | 8/2012 | Blinick et al. | 711/118 |
| 8,356,126 | B2 | 1/2013 | Ashmore | |
| 8,478,945 | B2 * | 7/2013 | Ash et al. | 711/143 |
| 8,700,854 | B2 * | 4/2014 | Ash et al. | 711/119 |
| 8,788,742 | B2 * | 7/2014 | Benhase et al. | 711/103 |
| 8,788,755 | B2 * | 7/2014 | Satran et al. | 711/114 |
| 8,799,571 | B1 * | 8/2014 | DesRoches et al. | 711/114 |
| 8,806,122 | B2 * | 8/2014 | Benhase et al. | 711/113 |
| 2002/0069322 | A1 | 6/2002 | Galbraith et al. | |
| 2003/0041214 | A1 | 2/2003 | Hirao et al. | |
| 2003/0225977 | A1 | 12/2003 | Desai et al. | |
| 2004/0205298 | A1 | 10/2004 | Beardon et al. | |
| 2004/0205299 | A1 | 10/2004 | Beardon | |
| 2005/0021879 | A1 | 1/2005 | Douglas | |
| 2005/0060495 | A1 | 3/2005 | Pistoulet | |
| 2005/0071596 | A1 * | 3/2005 | Aschoff et al. | 711/170 |
| 2005/0235108 | A1 | 10/2005 | Hiratsuka | |
| 2005/0235125 | A1 | 10/2005 | Accapadi et al. | |
| 2006/0020759 | A1 | 1/2006 | Barrick et al. | |
| 2006/0248278 | A1 | 11/2006 | Beeston et al. | |
| 2006/0248387 | A1 | 11/2006 | Nicholson et al. | |
| 2006/0288186 | A1 | 12/2006 | Accapadi et al. | |
| 2007/0005904 | A1 | 1/2007 | Lemoal et al. | |
| 2007/0239747 | A1 | 10/2007 | Pepper | |
| 2007/0276993 | A1 | 11/2007 | Hirutsaka | |
| 2008/0005481 | A1 | 1/2008 | Walker | |
| 2009/0219760 | A1 | 9/2009 | Arya et al. | |
| 2010/0169283 | A1 | 7/2010 | Atluri et al. | |
| 2010/0208385 | A1 | 8/2010 | Toukarin | |
| 2011/0145508 | A1 | 6/2011 | Pelleg et al. | |
| 2012/0047548 | A1 | 2/2012 | Rowlands et al. | |
| 2012/0144123 | A1 | 6/2012 | Aronovich et al. | |
| 2013/0326149 | A1 * | 12/2013 | Barrell et al. | 711/135 |
| 2014/1250268 | | 9/2014 | Traut et al. | |

\* cited by examiner

Fig. 3 Data storage system
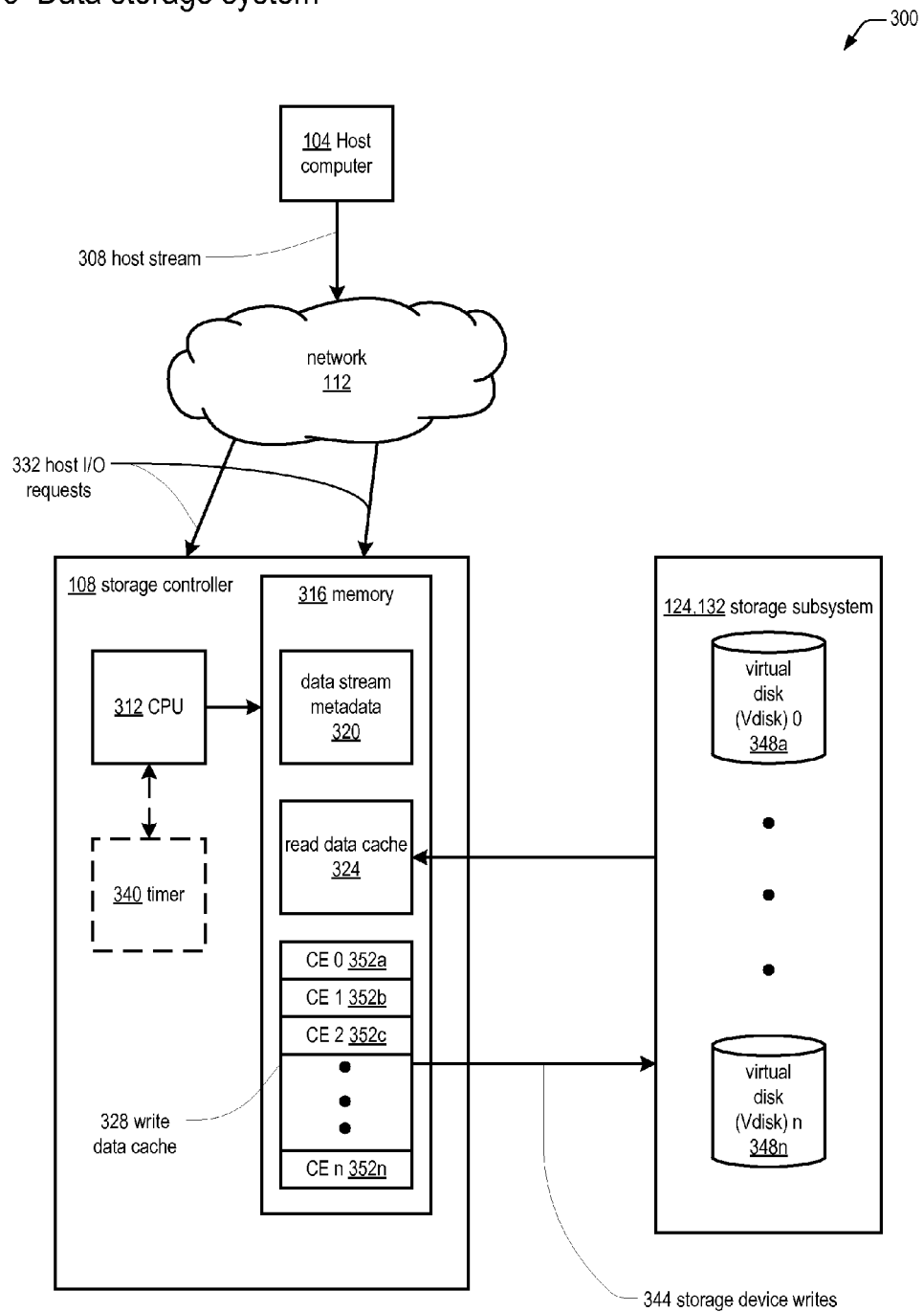

Fig. 4a  Single storage device striped volume
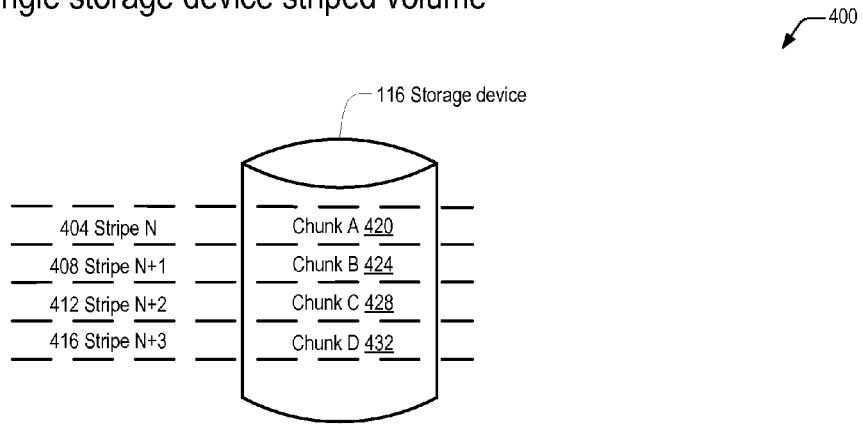
Fig. 4b  Multiple storage device striped volume
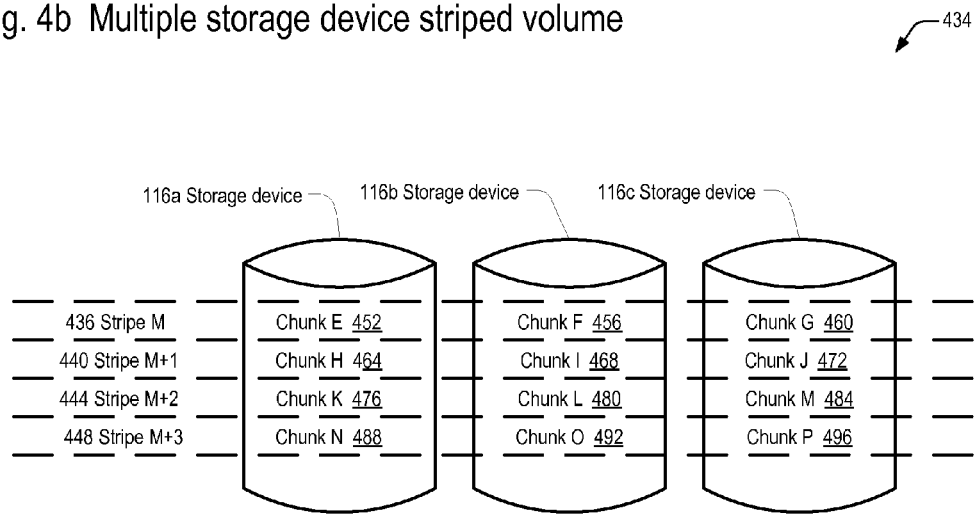

Fig. 5 Write data cache data flow
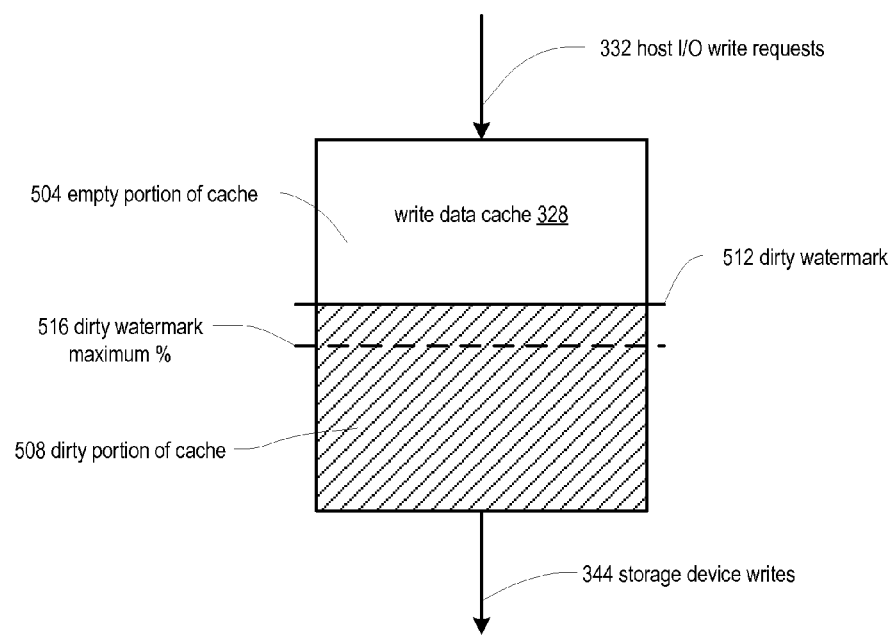

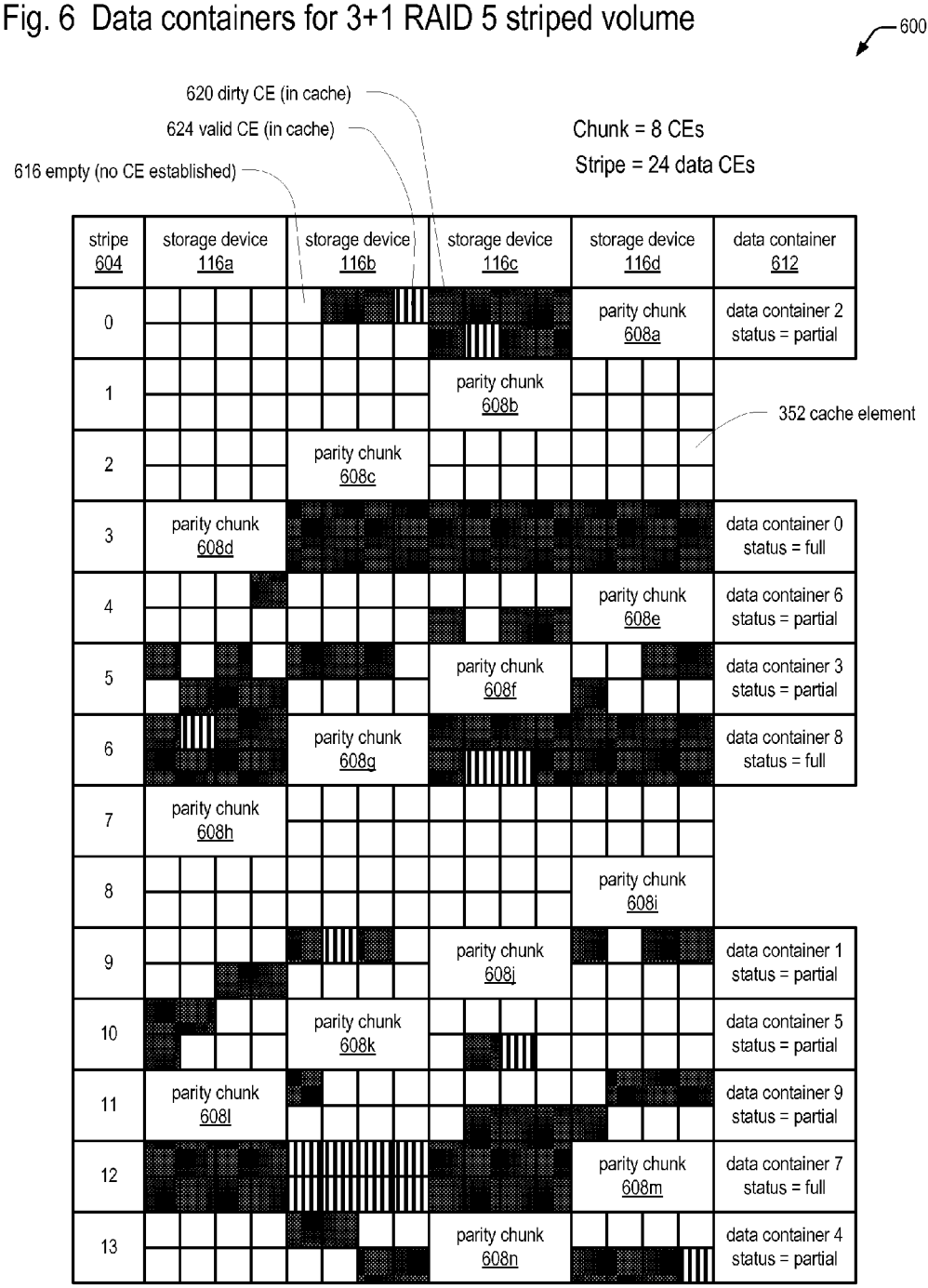
Fig. 6 Data containers for 3+1 RAID 5 striped volume

Fig.7a Calculation of full stripe write percentage

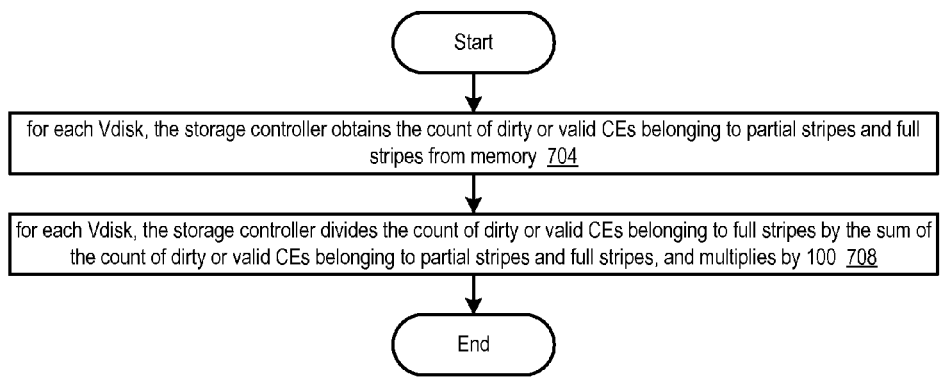

Fig. 7b Calculation of full stripe write percentage example dirty CEs belonging to partial stripes per VDisk 712 dirty CEs belonging to full stripes per VDisk 716 dirty CEs per VDisk 720 = 712 dirty CEs belonging to partial stripes + 716 dirty CEs belonging to full stripes full stripe write % 724 = $\dfrac{716 \text{ dirty CEs belonging to full stripes per VDisk}}{720 \text{ dirty CEs per VDisk}} \times 100$ 712 dirty CEs belonging to partial stripes = 25
716 dirty CEs belonging to full stripes = 50
720 dirty CEs per Vdisk = 25 + 50 = 75

724 full stripe write % = $\dfrac{50}{75}$ X 100 = .67 X 100 = 67%

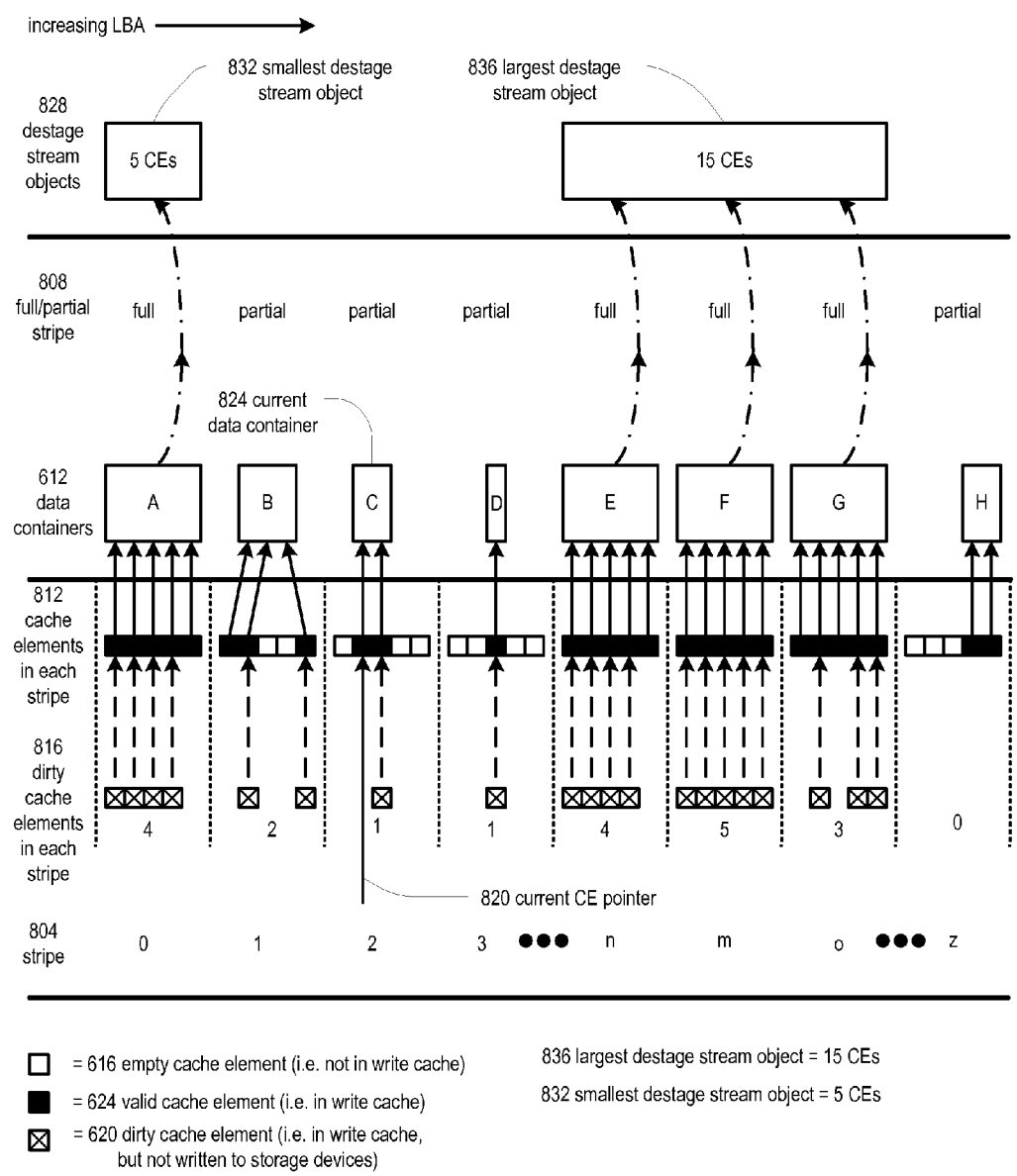
Fig. 8 Write data stream metadata parameters

Fig. 9a  Data stream global metadata
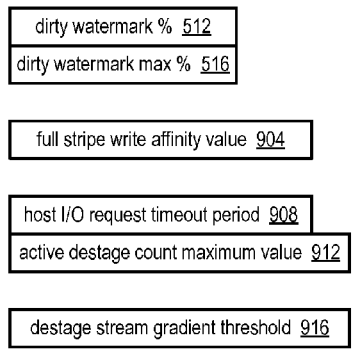
Fig. 9b  Data stream VDisk metadata (per VDisk)
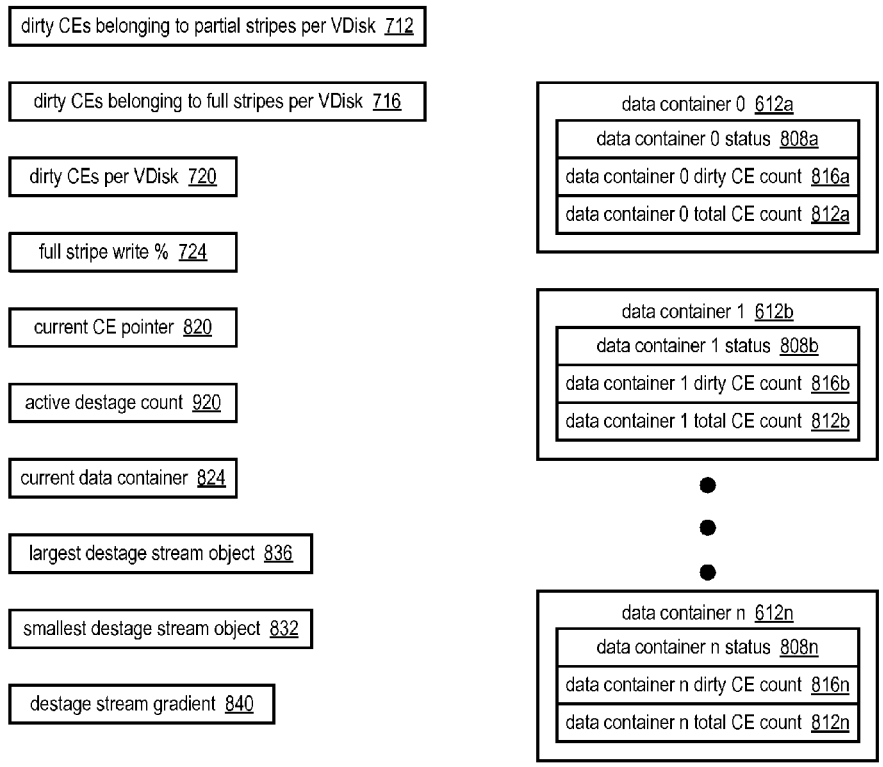

Fig. 10 Metadata initialization process
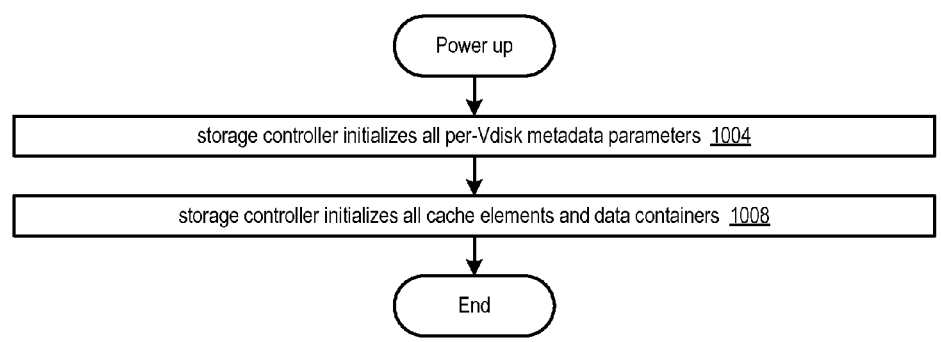

Fig. 11 Stream destage initiation process
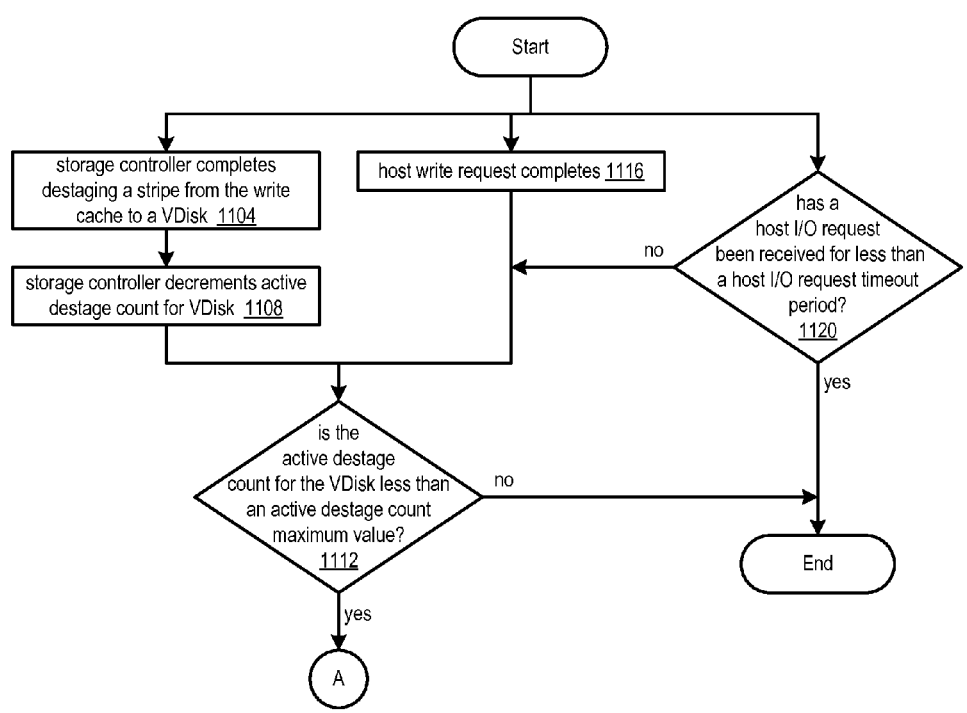

Fig. 12 Main process
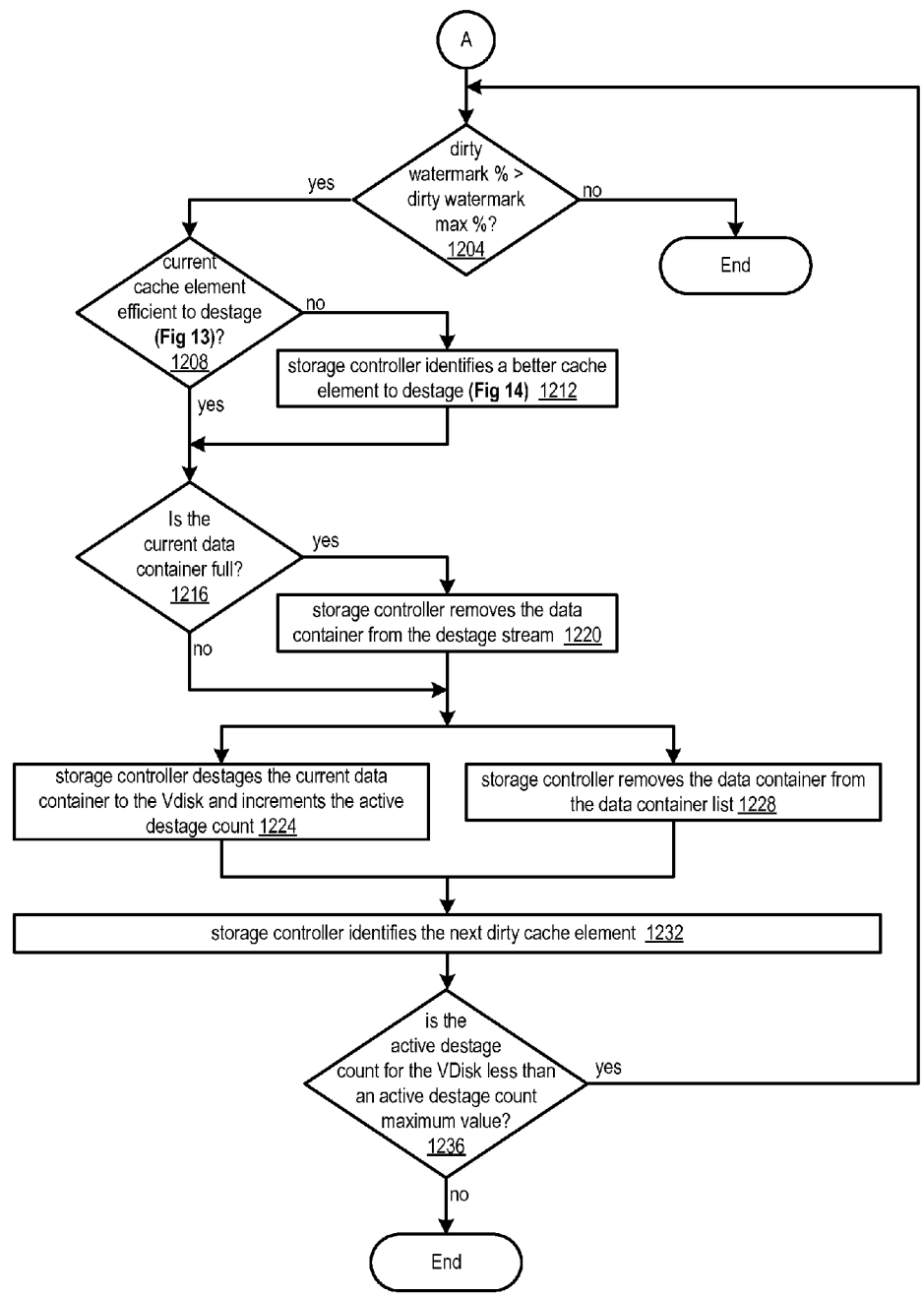

Fig. 13 Determine efficient cache element to destage process
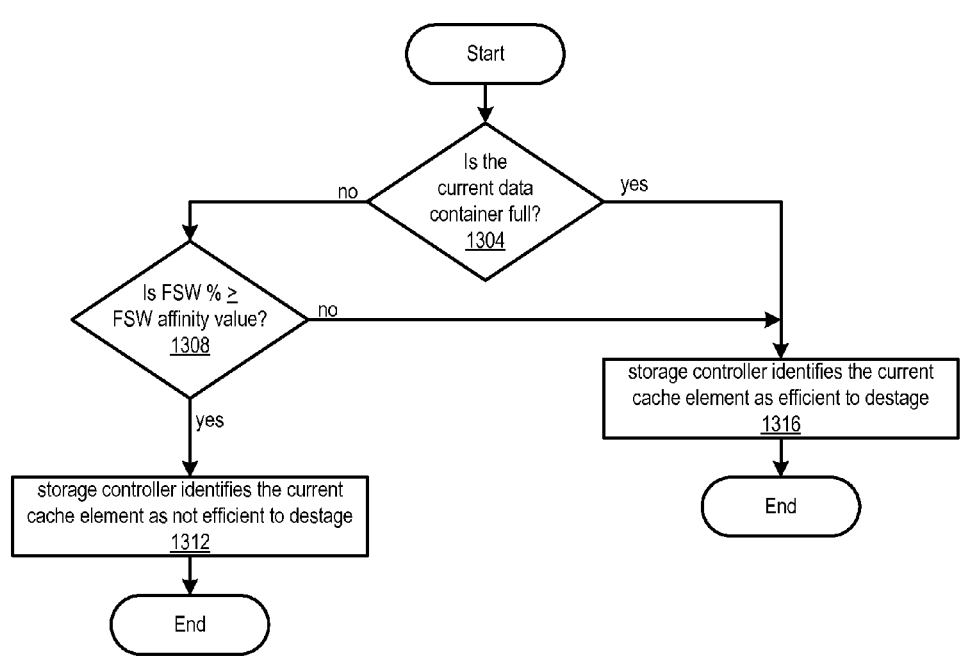

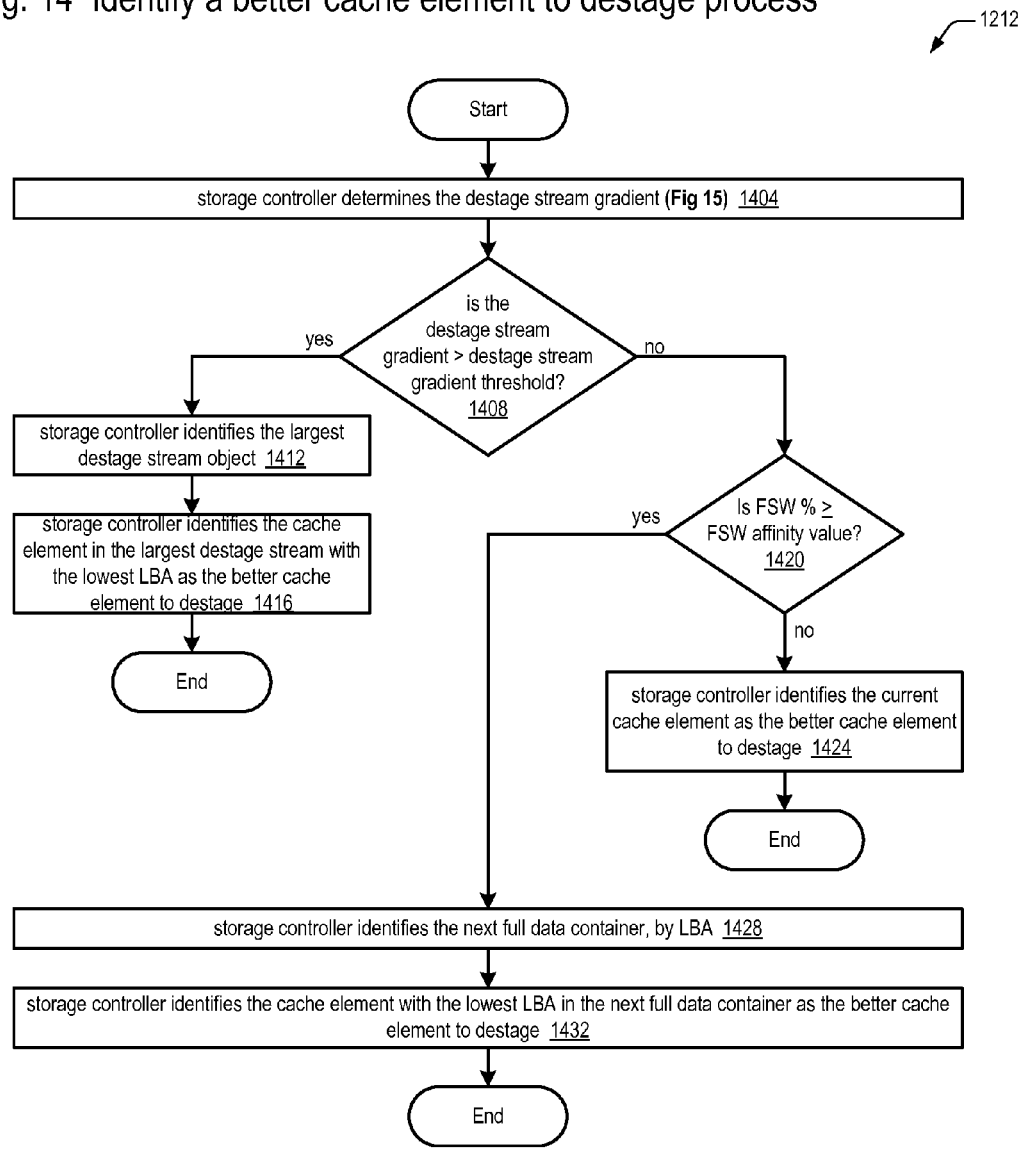
Fig. 14 Identify a better cache element to destage process

Fig. 15 Determination of destage stream gradient process
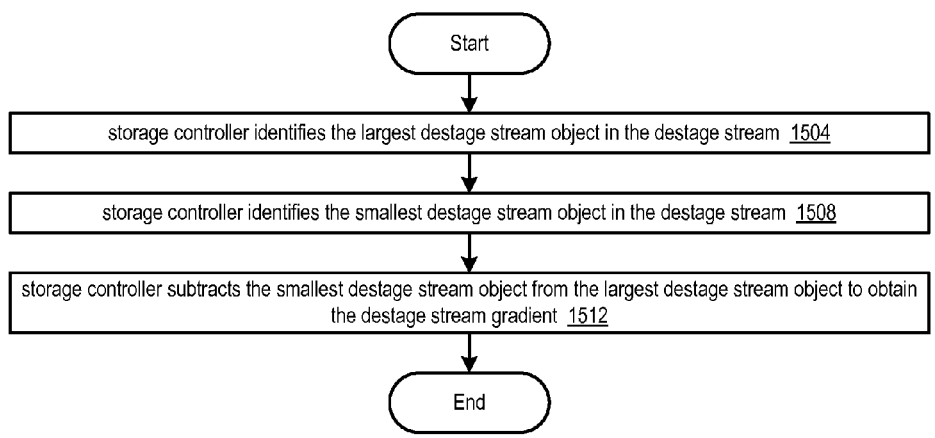

METHOD AND APPARATUS FOR EFFICIENTLY DESTAGING SEQUENTIAL I/O STREAMS

CROSS REFERENCE TO RELATED APPLICATION(S)

This application is a Continuation-in-Part of pending non-Provisional U.S. application Ser. No. 13/482,314 filed May 29, 2012, entitled WRITE CACHE MANAGEMENT METHOD AND APPARATUS, which is hereby incorporated by reference for all purposes. This application is related to pending non-Provisional U.S. application Ser. No. 13/952,733, filed Jul. 29, 2013, entitled METHOD AND APPARATUS FOR EFFICIENT CACHE READ AHEAD, pending non-Provisional U.S. application Ser. No. 13/952,749, filed Jul. 29, 2013, entitled METHOD AND APPARATUS FOR EFFICIENT READ CACHE OPERATION, and pending non-Provisional U.S. application Ser. No. 14/456,328, filed Aug. 11, 2014, entitled METHOD AND APPARATUS FOR SEQUENTIAL STREAM I/O PROCESSING.

FIELD

The present invention is directed to computer data storage systems. In particular, the present invention is directed to methods and apparatuses for efficiently destaging sequential write data from a storage controller cache memory to storage devices of a striped volume.

BACKGROUND

In data storage systems, write performance is increased by utilizing well known data caching techniques, including write back caching. When a storage controller receives a write request from a host computer, the storage controller stores the write data in the write cache, if space is available in the write cache, and notifies the host computer that the write request is complete. This then frees up the host computer to issue additional read or write requests. If write cache space is not available, the storage controller must instead transfer the write request directly to the slower storage devices, thus degrading write performance.

Once the write data is in the write cache, the storage controller institutes various policies to determine when, which, and how much write data to transfer to destination storage devices. The actions surrounding this transfer are referred to as destaging data from the write cache. Destaging write data is important as it frees up write cache space to accept new write requests from host computers, and the data is stored on storage devices in redundant RAID configurations. Redundant RAID configurations preserve data in the event of a single storage device failure—and in some RAID configurations—multiple storage device failures. It is therefore desirable to efficiently destage write data from a storage controller write cache to storage devices.

SUMMARY

The present invention is directed to solving disadvantages of the prior art. In accordance with embodiments of the present invention, a method for efficiently destaging write data from a storage controller to storage devices is provided. The method includes determining, by the storage controller, that a cache element should be transferred from a write cache of the storage controller to the storage devices. Cache elements are fixed size portions of the write cache. The method also includes calculating that a dirty watermark is above a dirty watermark maximum value, identifying a first cache element to destage from the write cache to the storage devices, transferring a first data container comprising the first cache element from the write cache to the storage devices, and incrementing an active destage count. The dirty watermark identifies the amount of dirty data in the write cache, and dirty data is data in the write cache that has not yet been written to storage devices. The active destage count is a current number of write requests issued to a virtual disk that have not yet been completed. The virtual disk is a RAID group comprising one or more specific storage devices. The method further includes repeating determining, calculating, identifying, transferring, and incrementing, by the storage controller, if the active destage count is less than an active destage count maximum value.

In accordance with other embodiments of the present invention, a storage controller for efficiently destaging write data to storage devices is provided. The storage controller includes a processor and a memory, coupled to the processor. The memory includes a write cache, which includes a plurality of cache elements. Cache elements are fixed size portions of the write cache. The storage controller determines that a cache element should be transferred from the write cache to the storage devices, calculates that a dirty watermark is above a dirty watermark maximum value, identifies a first cache element to destage from the write cache to the storage devices, transfers a first data container including the first cache element from the write cache to the storage devices, increments an active destage count, and repeats determines, calculates, identifies, transfers, and increments, if the active destage count is less than an active destage count maximum value. The dirty watermark identifies the amount of dirty data in the write cache, where dirty data is data in the write cache that has not yet been written to storage devices. The active destage count is a current number of write requests issued to a virtual disk that have not yet been completed. The virtual disk is a RAID group comprising one or more specific storage devices.

In accordance with still other embodiments of the present invention, a system for efficiently transferring write data to storage devices is provided. The system includes a host computer, a storage controller, coupled to the host computer, and a virtual disk including one or more storage devices, coupled to the storage controller. The storage controller includes a processor and memory, coupled to the processor. The memory includes a write cache, which includes a plurality of cache elements. Cache elements are fixed size portions of the write cache, and each cache element of the plurality of cache elements corresponds to an active data container. The virtual disk is a RAID group including one or more specific storage devices of the one or more storage devices. The host computer transfers a write request to the storage controller. In response to receiving the write request, the storage controller stores write data corresponding to the write request in the plurality of cache elements. The storage controller determines that a cache element should be transferred from the write cache to the virtual disk, calculates that a dirty watermark is above a dirty watermark maximum value, identifies a first cache element to destage from the write cache to the virtual disk, transfers a data container comprising the first cache element from the write cache to the virtual disk, increments an active destage count, and repeats determines, calculates, identifies, transfers, and increments, if the active destage count is less than an active destage count maximum value. The dirty watermark identifies the amount of dirty data in the write cache, where dirty data is data in the write cache that has not yet been written to storage devices. The active destage count is a current number of write requests issued to the virtual disk that have not yet been completed.

An advantage of the present invention is that it improves write performance to a striped virtual disk by efficiently destaging write data from a storage controller write cache. Without an efficient means to destage stripes to a striped volume, one of two outcomes are likely. A storage controller may over-aggressively copy write data from the write cache to the striped volume, resulting in under-utilization of the write cache and little benefit to write caching in general. Alternatively, a storage controller may under-aggressively copy write data from the write cache to the striped volume, resulting in a generally full write cache. When the write cache is full, the storage controller must either delay new writes until space is available in the write cache, or else handle new writes in a write-through mode directly to storage devices. Both results reduce performance.

Another advantage of the present invention is it is able to destage the largest available sequence of consecutive write data, which frees up the most space in write cache for new host write data. This maximizes available space in write cache, thus allowing a storage controller to store larger write requests and more write requests in the write cache.

Yet another advantage of the present invention is that it allows for much faster searching for better alternative write data to destage than previous methods that check in sequence every dirty cache element. The present invention utilizes the concept of data containers to quickly identify full stripes available for destage. There are generally many fewer data containers than cache elements, since data containers include a predetermined number of cache elements. Additionally, there are generally many fewer destage streams than data containers, so searching destage streams as performed in the present invention is much faster than searching either data containers or cache elements.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4a is a diagram illustrating a single storage device striped volume in accordance with embodiments of the present invention.

FIG. 4b is a diagram illustrating a multiple storage device striped volume in accordance with embodiments of the present invention.

FIG. 5 is a diagram illustrating write data cache data flow in accordance with embodiments of the present invention.

FIG. 6 is a diagram illustrating exemplary data containers for a 3+1 RAID 5 striped volume in accordance with embodiments of the present invention.

FIG. 7a is a flowchart illustrating a calculation of full stripe write percentage process in accordance with embodiments of the present invention.

FIG. 7b is a diagram illustrating an exemplary calculation of full stripe write percentage in accordance with embodiments of the present invention.

FIG. 8 is a diagram illustrating write data stream metadata parameters in accordance with embodiments of the present invention.

FIG. 9a is a diagram illustrating data stream global metadata in accordance with embodiments of the present invention.

FIG. 9b is a diagram illustrating data stream virtual disk metadata in accordance with embodiments of the present invention.

FIG. 10 is a flowchart illustrating a metadata initialization process in accordance with embodiments of the present invention.

FIG. 11 is a flowchart illustrating a stream destage initiation process in accordance with embodiments of the present invention.

FIG. 12 is a flowchart illustrating a main process in accordance with embodiments of the present invention.

FIG. 13 is a flowchart illustrating a process to determine if the current cache element is efficient to destage in accordance with embodiments of the present invention.

FIG. 14 is a flowchart illustrating a process to identify a better cache element to destage in accordance with embodiments of the present invention.

FIG. 15 is a flowchart illustrating a process to determine the destage stream gradient for the corresponding virtual disk in accordance with embodiments of the present invention.

DETAILED DESCRIPTION

The present inventors have observed various performance problems in certain I/O workloads from host computers to storage controllers. In particular, storage controller write caches may be difficult to manage efficiently when large sequential write streams are involved.

Parity RAID write operations involve storing the new write data to a write cache, reading old write data and parity from storage devices, creating new parity, and writing the new write data and new parity to storage devices. It is much more efficient to process parity RAID write operations on a full stripe write, rather than partial stripe writes. Partial stripe writes include less than all of the data in a full stripe. The present invention improves performance by destaging full stripes in preference to partial stripes for large sequential write streams.

Figure 1A:
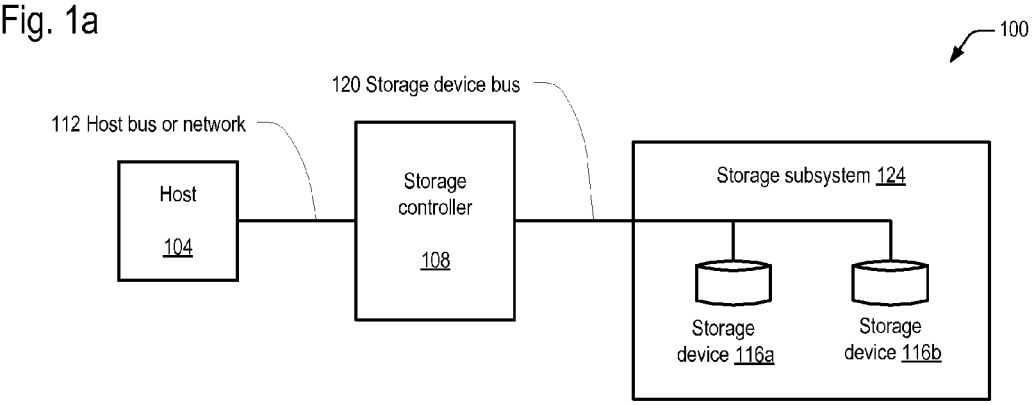
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, NVMe, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
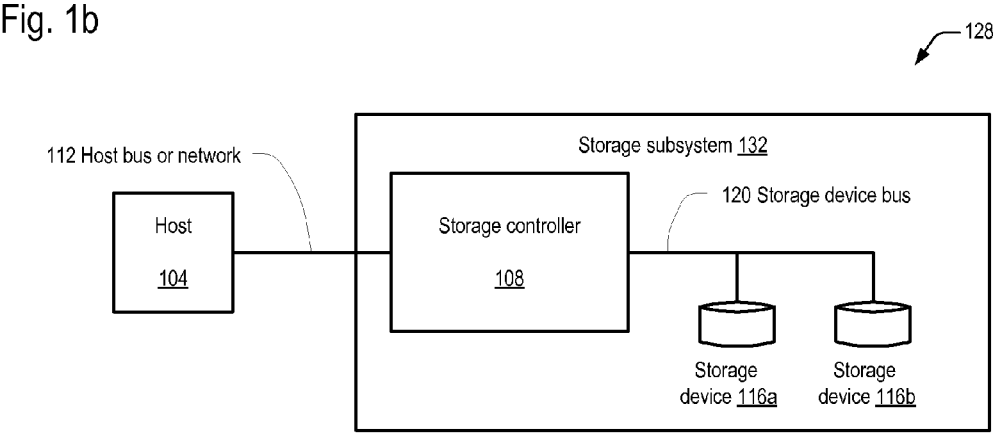
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
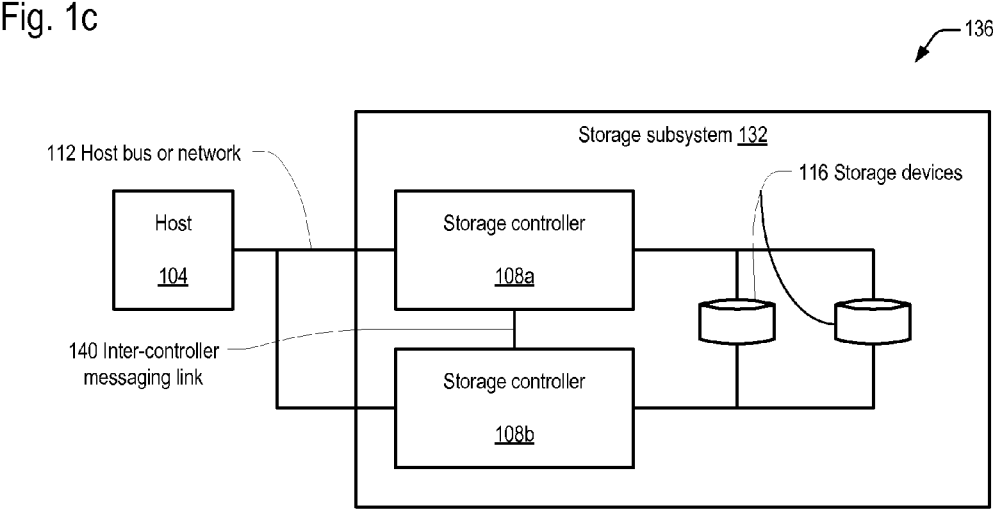
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
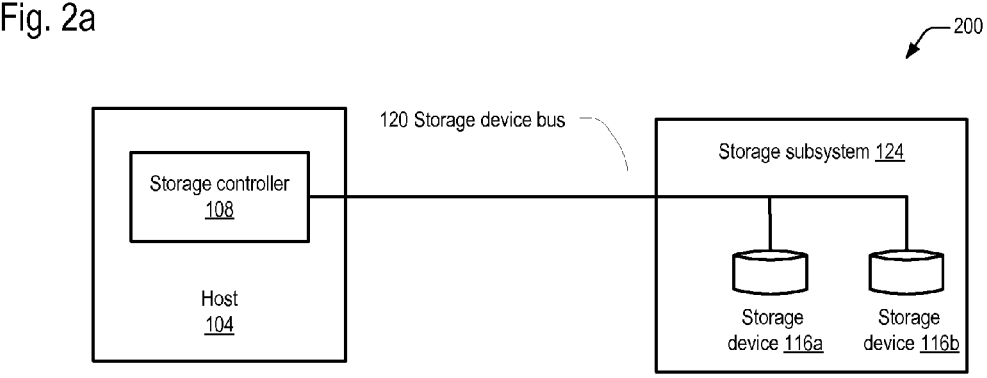
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
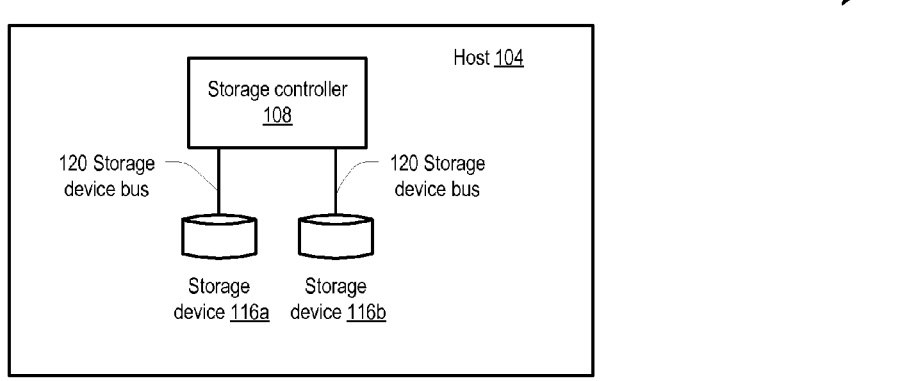
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
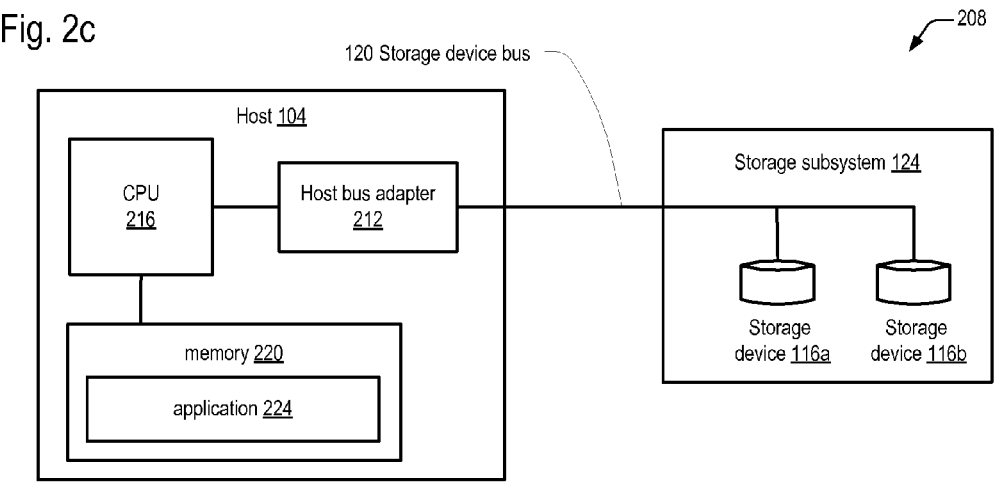
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 104 interconnected to a storage controller 108 through bus or network 112. Host computer 104 generates a host stream 308, which are multiple groups of sequential host I/O requests 332.

Storage controller 108 includes a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present invention. Examples of non-volatile memory 316 include, but are not limited to, flash memory, SD, SSD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read data cache 324 and a write data cache 328 or write cache, which provide improved read and write performance, respectively, to the host computer 104. Memory 316 also includes data stream metadata 320. Data stream metadata 320 stores parameters related to host I/O requests 332, and is used to control sequential I/O operations.

Storage controller 108 is coupled to storage subsystem 124, 132, which includes one or more virtual disks (VDisks) 348a-348n. Each virtual disk 348 is a different RAID volume, and includes one or more storage devices 116. Frequently accessed data is read from virtual disks 348 into the read data cache 324, where it can be provided in response to host read requests 332 much faster than directly from the virtual disks 348. Write data is initially stored in the write data cache 328, which is much faster than writes sent directly to virtual disks 348. The write data cache 328 is divided into a predetermined number of fixed-size cache elements 352, identified as CE 0

352a-CE n 352n. The storage controller 108 transfers storage device writes 344 from the write data cache 328, and more specifically from the cache elements 352, to the virtual disks 348.

In some embodiments, storage controller 108 includes timers 340. Timers 340 may be hardware timers controlled by CPU 312, or it may be software routines that executes on CPU 312. Timers 340 measure host I/O request timeout periods 908, and is discussed in the following description and figures. Timers 340 may represent any number of timers, and in the present invention there is one timer 340 allocated globally to all host I/O requests 332.

It should be understood that storage controller 108 may be functionally organized in countless different functional organizations and architectures without diverting from the scope or operation of the present invention.

Referring now to FIG. 4a, a block diagram illustrating components of a single storage device striped volume 400, in accordance with embodiments of the present invention is shown.

A single storage device 116 may be a striped volume 400. Storage device 116 may be a hard disk drive, optical drive, tape drive, solid state device, or any other form of mass data storage device. A striped volume 400 is a logical volume comprising two or more evenly sized stripes. The portion of a stripe on one storage device 116 is a chunk.

FIG. 4a illustrates a striped volume 400 having four stripes: stripe N 404, stripe N+1 408, stripe N+2 412, and stripe N+3 416. Stripe N 404 has chunk A 420, stripe N+1 408 has chunk B 424, stripe N+2 412 has chunk C 428, and stripe N+3 416 has chunk D 432. Although FIG. 4a illustrates a single storage device striped volume 400 with four stripes 404, 408, 412, and 416 and four chunks 420, 424, 428, and 432, it should be understood that a single storage device striped volume 400 may have fewer than four stripes/chunks or more than four stripes/chunks. Additionally, a single storage device striped volume 400 may occupy only a portion of the available data storage space on a single storage device 116, and there may be other single storage device striped volumes 400 on the same storage device 116. When a virtual disk 348 is a single storage device 116, the virtual disk stripe size is the size of a chunk 420, 424, 428, or 432.

Referring now to FIG. 4b, a block diagram illustrating components of a multiple storage device striped volume 434 in accordance with embodiments of the present invention is shown.

Multiple storage devices 116, or a portion of multiple storage devices 116, may be a striped volume 434. FIG. 4b illustrates a striped volume 434 on three storage devices 116a, 116b, and 116c. Striped volume 434 has four stripes: stripe M 436, stripe M+1 440, stripe M+2 444, and stripe M+3 448. Stripe M 436 has chunks E 452, F 456, and G 460. Stripe M+1 440 has chunks H 464, 1468, and J 472. Stripe M+2 444 has chunks K 476, L 480, and M 484. Stripe M+3 448 has chunks N 488, 0 492, and P 496. Although FIG. 4b illustrates a multiple storage device striped volume 434 with four stripes 436, 440, 444, and 448 and three storage devices 116a, 116b, and 116c, it should be understood that a multiple storage device striped volume 434 may have fewer or more than four stripes or fewer or more than three storage devices 116. As used in the present invention, a "striped volume 400, 434" may be either a single storage device striped volume 400 or a multiple storage device striped volume 434. Additionally, a multiple storage device striped volume 434 may occupy only a portion of the available data storage space on a group of storage devices 116, and there may be other multiple storage device striped volumes 434 on the same group of storage devices 116. When a virtual disk 348 is multiple storage devices 116, the virtual disk stripe size is the combined size of the chunks in a stripe: either chunks 452+456+460, 464+468+472, 476+480+484, or 488+492+496 in the three-storage device 116 case of FIG. 4b Referring now to FIG. 5, a block diagram illustrating a write data cache 328 data flow in accordance with embodiments of the present invention is shown. Write data cache 328 is part of memory 316 of storage controller 108. Write data cache 328 receives host I/O write requests 332 from host computers 104 over host bus or network 112, and stores the write data in write data cache 328 as dirty data. Dirty data is write data from host I/O write requests 332 stored in the write data cache 328 that has not yet been written to storage devices 116. Host data writes are stored in the dirty portion of cache 508, awaiting conditions that will transfer storage device writes 344 from the dirty portion of cache 508 to striped volume 400, 434. Storage device writes 344 are either partial stripe writes or full stripe writes. The portion of the write data cache 328 that is not occupied by dirty data is the empty portion of the cache 504, and it is available to receive write data from the host I/O write requests 332.

A dirty watermark 512 is maintained by the storage controller 108 to keep track of the amount of dirty data in the write data cache 328. As more dirty data 508 is accumulated in the write data cache 328, the dirty watermark 512 increases accordingly, and as dirty data 508 is destaged to storage devices 116, the dirty watermark 512 decreases accordingly.

The write data cache 328 also includes a dirty watermark maximum percentage 516 or dirty watermark maximum value, which is a predetermined value that is compared to the dirty watermark 512 at specific times to determine if a cache element 352 should be destaged from the write data cache 328 to a virtual disk 348.

As host I/O write requests 332 are received and written into write data cache 328, the dirty portion of cache 508 expands accordingly, as long as sufficient space to store the new write data is present in the data write cache 328. At the same time the dirty portion of cache 508 expands, the empty portion of cache 504 contracts. Similarly, as storage device writes 344 transfer data from the write data cache 328 to the virtual disks 348, the dirty portion of cache 508 contracts and the empty portion of cache 504 expands accordingly.

Referring now to FIG. 6, exemplary data containers 600 for a 3+1 RAID 5 striped volume 434 in accordance with embodiments of the present invention is shown. The 3+1 RAID 5 striped volume 434 includes four storage devices 116, identified as storage device 116a, storage device 116b, storage device 116c, and storage device 116d. The exemplary striped volume has 14 stripes 604, identified as stripe 0 through stripe 13. It should be understood that a striped volume 434 may have any number of storage devices 116 or stripes 604, subject to limitations of RAID technology, striped volume size, and so forth.

The portion of the stripe 604 allocated to a single storage device 116 is a chunk. In the example of FIG. 6, each chunk is divided into eight equal-sized cache elements (CEs) 352. However, in other embodiments, each chunk may have less than or more than eight cache elements 352. In the preferred embodiment, cache elements 352 are 16 Kbytes each. In other embodiments, cache elements 352 are less than or more than 16 Kbytes each. Each cache element 352 may have a status of either empty 616, dirty 620, or valid 624. Only dirty cache elements 620 contain new write data. Valid cache elements 624 contain write data that has been previously written to storage devices 116.

In the example of FIG. 6, the striped volume 434 is mapped according to RAID 5 techniques, where a parity chunk rotates across each of the storage devices 116 depending on stripe 604. In one embodiment, parity chunk 608a is assigned to stripe 0 of storage device 116d, parity chunk 608b is assigned to stripe 1 of storage device 116c, and so on.

Data containers 612 are data structures assigned on a stripe 604 basis as new write data is received, and do not exceed stripe 604 boundaries. Data containers 612 include a status 808 having one of three values: either unknown, partial, or full. When a data container 612 is initially created, the data container 612 has a status 808 of unknown. When new write data is associated with a data container 612, and one or more empty CEs 616 remain, the data container 612 has a status 808 of partial. When new write data is associated with the data container 612, and all CEs 352 of the data container 612 are either dirty CEs 620 or valid CEs 624, the data container 612 has a status 808 of full. In the preferred embodiment, data containers 612 are assigned sequentially. However, in other embodiments, data containers 612 may be assigned in any order as long as no two stripes 604 have the same data container 612 number.

Stripe 3 was the first stripe 604 to receive write data in the striped volume 434 of FIG. 6, and therefore is data container 0. Since all CE's 352 of stripe 3 are dirty CE's 620, data container 0 has a status 808 of full.

Stripe 9 was the second stripe 604 to receive write data in the striped volume 434 of FIG. 6, and therefore is data container 1. Since only some but not all CE's 352 of stripe 9 are dirty CE's 620 or valid CEs 624, data container 1 has a status 808 of partial.

Stripe 0 was the third stripe 604 to receive write data in the striped volume 434 of FIG. 6, and therefore is data container 2. Since only some but not all CE's 352 of stripe 0 are dirty CE's 620 or valid CEs 624, data container 2 has a status 808 of partial.

Stripe 5 was the fourth stripe 604 to receive write data in the striped volume 434 of FIG. 6, and therefore is data container 3. Since only some but not all CE's 352 of stripe 5 are dirty CE's 620 or valid CEs 624, data container 3 has a status 808 of partial.

Stripe 13 was the fifth stripe 604 to receive write data in the striped volume 434 of FIG. 6, and therefore is data container 4. Since only some but not all CE's 352 of stripe 13 are dirty CE's 620 or valid CEs 624, data container 4 has a status 808 of partial.

Stripe 10 was the sixth stripe 604 to receive write data in the striped volume 434 of FIG. 6, and therefore is data container 5. Since only some but not all CE's 352 of stripe 10 are dirty CE's 620 or valid CEs 624, data container 5 has a status 808 of partial.

Stripe 4 was the seventh stripe 604 to receive write data in the striped volume 434 of FIG. 6, and therefore is data container 6. Since only some but not all CE's 352 of stripe 4 are dirty CE's 620 or valid CEs 624, data container 6 has a status 808 of partial.

Stripe 12 was the eighth stripe 604 to receive write data in the striped volume 434 of FIG. 6, and therefore is data container 7. Since all CE's 352 of stripe 12 are dirty CE's 620 or valid CEs 624, data container 7 has a status 808 of full.

Stripe 6 was the ninth stripe 604 to receive write data in the striped volume 434 of FIG. 6, and therefore is data container 8. Since all CE's 352 of stripe 6 are dirty CE's 620 or valid CEs 624, data container 8 has a status 808 of full.

Stripe 11 was the tenth stripe 604 to receive write data in the striped volume 434 of FIG. 6, and therefore is data container 9. Since only some but not all CE's 352 of stripe 11 are dirty CE's 620 or valid CEs 624, data container 9 has a status 808 of partial.

Only 10 data containers 612 have been assigned since only 10 stripes 604 have dirty CE's 620 or valid CEs 624 in write data cache 328. Stripes 1, 2, 7, and 8 do not have data containers 612 assigned since all CE's 352 in those stripes 604 are empty CE's 616.

Referring now to FIG. 7a, a flowchart illustrating a calculation of full stripe write percentage 724 process in accordance with embodiments of the present invention is shown. The calculation of full stripe write percentage 724 process is invoked at various points in the processes of the present invention to determine when a cache element 352 should be destaged from the write data cache 328. Flow begins at block 704.

At block 704, for each virtual disk 348 the storage controller 108 obtains the count of dirty or valid cache elements belonging to partial stripes 712 and full stripes 716 from the data stream metadata 320. Flow proceeds to block 708.

At block 708, for each virtual disk 348 the storage controller 108 divides the count of dirty or valid cache elements belonging to full stripes 716 by the sum of the count of dirty or valid cache elements per virtual disk 720, and multiplies the result by 100. The count of dirty or valid cache elements per virtual disk 720 is equal to the sum of the dirty or valid cache elements belonging to partial stripes per virtual disk 712 and the count of dirty or valid cache elements belonging to full stripes per virtual disk 716. Flow ends at block 708.

Referring now to FIG. 7b, an exemplary calculation of full stripe write percentage 724 in accordance with embodiments of the present invention is shown. The storage controller 108 calculates full stripe write percentage 724 at various points in the processes of the present invention; specifically, block 1308 of FIG. 13 and block 1420 of FIG. 14. The example described below utilizes the steps of the process illustrated in FIG. 7a.

The storage controller 108 maintains cache element 352 statistics in the data stream metadata 320 for all cache elements 352 in the write data cache 328. More specifically, the storage controller 108 maintains a current count of dirty or valid cache elements belonging to partial stripes for each virtual disk 712, and a current count of dirty or valid cache elements belonging to full stripes for each virtual disk 716. Therefore, each virtual disk 348 managed by the storage controller 108 has a unique current count of dirty or valid cache elements belonging to partial stripes 712, and a current count of dirty or valid cache elements belonging to full stripes 716.

The storage controller 108 also maintains a current count of all dirty or valid cache elements per virtual disk 720 in the data stream metadata 320. The current count of all dirty or valid cache elements per virtual disk 720 is equal to the sum of current count of dirty or valid cache elements belonging to partial stripes for each virtual disk 712 and a current count of dirty or valid cache elements belonging to full stripes for each virtual disk 716.

The storage controller 108 in some embodiments maintains the full stripe write percentage for each virtual disk 724 in the data stream metadata 320. In other embodiments, the storage controller 108 calculates the full stripe write percentage for each virtual disk 724 in an as-needed basis, and does not specifically store the full stripe write percentage for each virtual disk 724 in the data stream metadata 320. In a current example, there are 25 dirty or valid cache elements belonging to partial stripes 712 and 50 dirty or valid cache elements belonging to full stripes 716, for a given virtual disk 348. The storage controller 108 calculates the current count of dirty or valid cache elements for the given virtual disk 720 by adding the 25 dirty or valid cache elements belonging to partial stripes 712 to the 50 dirty or valid cache elements belonging to full stripes 716. Therefore, there are 75 dirty or valid cache elements per the given virtual disk 348.

Next, the storage controller 108 calculates the full stripe write percentage 724 for the given virtual disk 348 by dividing the current count of dirty or valid cache elements belonging to full stripes for the given virtual disk 716 by the current count of dirty or valid cache elements in the given virtual disk 720. Therefore, 50 divided by 75 is 0.667, and when multiplies by 100, the full stripe write percentage 724 for the given virtual disk 348 is 67%.

Referring now to FIG. 8, a diagram illustrating write data stream metadata 320 parameters in accordance with embodiments of the present invention is shown. The storage controller 108 of the present invention manages metadata 320 at three levels: at a cache element 352 level, at a data container 612 level, and at a destage stream object 828 level.

At the cache element 352 level, the storage controller 108 maintains metadata for each stripe 604. Specifically, the storage controller 108 identifies the cache elements in each stripe 812 according to whether each cache element 352 is present in the stripe 604, or not. "Present", in this context, means that a cache element 253 has a status of either dirty 620 or valid 624. Additionally, for the cache elements in each stripe 812, the storage controller 108 identifies which cache elements 352 are dirty cache elements in each stripe 816 (i.e. with a cache element status of dirty 620. Since there can never be more dirty cache elements than total cache elements in each stripe 604, the number of dirty cache elements in each stripe 816 is always less than or equal to the number of cache elements in each stripe 812. The storage controller 108 also maintains a current cache element pointer 820 that identifies a specific cache element 352.

At the data container 612 level, the storage controller 108 associates cache elements 352 with specific data containers 612. The storage controller 108 also maintains data stream metadata 320 for each data container 612, including data container status 808. Data container status 808 identifies whether each data container 612 is either full or partially full. It should be noted that data containers 612 are only established when at least one cache element 352 is either dirty 620 or valid 624 in a given stripe 604, and data containers 612 are not established if every cache element 352 in a chunk has a status of empty 616. Because the current cache element pointer 820 identifies a specific cache element 352, it also identifies a specific data container 612. For example, the current cache element pointer 820 identifies data container C as the current data container 824.

At the destage stream object 828 level, the storage controller 108 identifies the full data containers 612. Full data containers 612 are data containers 612 where every cache element 352 in a given stripe 604 is either dirty 620 or valid 624. If at least one cache element 352 is empty or missing in the given stripe 604, the corresponding data container 612 is not full. The storage controller 108 additionally coalesces destage stream objects 828 into larger destage stream objects 828 if the destage stream objects 828 are directly adjacent, in logical block address (LBA). FIG. 8 shows data containers 612 "E", "F", and "G" as being full data containers 612, with five dirty cache elements 352 in each. Therefore, the storage controller 108 coalesces E, F, and G into one large destage stream object 836 including 15 cache elements 352. Once full data containers 612 are in the destage stream, the storage controller 108 identifies both a smallest destage stream object 832 and a largest destage stream object 836. In the example shown in FIG. 8, data container A 612 is the smallest destage stream object 832 with five cache elements 352 and data containers E/F/G 612 is the largest destage steam object 836 with fifteen cache elements 352.

The storage controller 108 also maintains a destage stream gradient 840 in the data stream metadata 320, for each virtual disk 348. The destage stream gradient 840 is the difference between the largest destage stream object 836 and the smallest destage steam object 832, where the largest destage stream object 836 includes coalesced destage stream objects 828. Therefore, in the example of FIG. 8, the destage stream gradient 840 is equal to 15-5 or 10 cache elements 352.

The storage controller 108 manages stripes 604, cache elements 352, data containers 612, and destage stream objects 828 in order, from lower LBA to higher LBA. Also, it should be noted that the storage controller 108 manages the metadata of FIG. 8 independently for each virtual disk 348.

Referring now to FIG. 9a, a diagram illustrating data stream global metadata 320a in accordance with embodiments of the present invention is shown. Global metadata 320a is metadata that is used across all virtual disks 348 and storage devices 116 controlled by a storage controller 108.

Data stream global metadata 320a includes a dirty watermark percentage 512 and a dirty watermark maximum percentage 516. The dirty watermark percentage 512 and dirty watermark maximum percentage 516 were discussed in more detail with respect to FIG. 5.

The data stream global metadata 320a includes a full stripe write affinity value 904. The full stripe write affinity value 904 is the threshold at which the storage controller 108 will opt to only issue full stripe writes from the write data cache 328. This value is best determined by empirical testing, and depends on the frequency and locality of reference of host data writes 332, the size of the write data cache 328, and the time required to destage partial or full stripes 808 from the write data cache 328. In the preferred embodiment, the full stripe write affinity value 904 is 50%. In another embodiment, the full stripe write affinity value 904 is 60%. However, in other embodiments, the full stripe write affinity value 904 is different than either 50% or 60%.

Data stream global metadata 320a also includes a host write request timeout period 908. The host write request timeout period 908 is a predetermined time period that is used to as one of the conditions to determine if a cache element 352 should be destaged from the write data cache 328. It is described in more detail with respect to FIG. 11.

The data stream global metadata 320a further includes an active destage count maximum value 912, which is the maximum number of destage stream objects 828 that may be destaged from the write data cache 328, for all virtual disks 348.

Finally, the data stream global metadata 320a additionally includes a destage stream gradient threshold 916, which is a predetermined value that is compared to the destage stream gradient 840 to determine which cache element 352, other than the current cache element 352 identified by the current cache element pointer 820, is a better cache element 352 to destage from the write data cache 328. The destage stream gradient threshold 916 is described in more detail with respect to FIG. 14.

Referring now to FIG. 9b, a diagram illustrating data stream virtual disk metadata 320b in accordance with embodiments of the present invention is shown. Data stream virtual disk metadata 320b is maintained independently for each and every virtual disk 348 controlled by the storage controller 108. Therefore, the storage controller 108 manages data stream virtual disk metadata 320b for a first virtual disk 348a independently from data stream virtual disk metadata 320b for a second 348b or other 348n virtual disk.

The data stream virtual disk metadata 320b includes dirty cache elements belonging to partial stripes per virtual disk 712, dirty cache elements belonging to full stripes per virtual disk 716, dirty cache elements per virtual disk 720, and the full stripe write percentage 724, all for each virtual disk 348. Each of these were described in more detail with reference to FIGS. 7a and 7b.

Data stream virtual disk metadata 320b also includes the current cache element pointer 820, current data container 824, smallest destage stream object 832, largest destage stream object 836, and destage stream gradient 840. Each of those metadata 320b parameters were discussed in more detail with respect to FIG. 8.

Data stream virtual disk metadata 320b further includes metadata related to each data container 612 in each virtual disk 348. For each data container 612, data container status 808 specifies whether the data container 612 is a full or partially full data container 612. Data container total CE counts 812 are the number of cache elements 352 in each data container 612, including both dirty cache elements 620 as well as valid cache elements 624. Data container dirty cache element counts 816 are the number of dirty cache elements 620 in each data container 612.

Finally, the data stream virtual disk metadata 320b also includes an active destage count 920 for each virtual disk 348. Each active destage count 920 specifies the current number of objects 828 the storage controller 108 has destaged to the corresponding virtual disk 348.

Referring now to FIG. 10, a flowchart illustrating a data stream metadata 320 initialization process in accordance with embodiments of the present invention is shown. Metadata 320 initialization occurs at storage controller 108 power-on, and at other times specifically designated. Flow begins at block 1004.

At block 1004, the storage controller 108 initializes all per-virtual disk metadata 320b parameters. The per-virtual disk metadata 320b parameters are described in more detail with respect to FIG. 9b. Flow proceeds to block 1008.

At block 1008, the storage controller 108 initializes all cache elements 352 and data containers 612. If no data containers 612 have not yet been established, then cache elements 352 and data containers 612 do not yet exist. If cache elements 352 and data containers 612 existed prior to a power cycle event, the storage controller 108 restores both to the state just prior to the power cycle. Flow ends at block 1008.

Referring now to FIG. 11, a flowchart illustrating a stream destage initiation process in accordance with embodiments of the present invention is shown. Flow begins at one of blocks 1104, 1116, or decision block 1120.

At block 1104, the storage controller 108 completes destaging one or more stripes 604 from the write data cache 328 to a virtual disk 348. Flow proceeds to block 1108.

At block 1108, the storage controller 108 decrements the active destage count 920 for the corresponding virtual disk 348. Flow proceeds to decision block 1112.

At decision block 1112, the storage controller 108 determines if the active destage count 920 for the corresponding virtual disk 348 is less than an actual destage count maximum value 912. If the active destage count 920 for the corresponding virtual disk 348 is less than the actual destage count maximum value 912, then flow proceeds to decision block 1204 of FIG. 12. If the active destage count 920 for the corresponding virtual disk 348 is not less than the actual destage count maximum value 912, then flow ends.

At block 1116, the storage controller 108 determines that a host I/O write request 332 has been completed. Therefore, the write data corresponding to the host I/O write request 332 has been written to a virtual disk 348. Flow proceeds to decision block 1112.

At decision block 1120, the storage controller 108 determines if a host I/O write request 332 has been received for more than a host I/O write request timeout period 908. If a host I/O write request 332 has been received for more than the host I/O write request timeout period 908, then flow proceeds to decision block 1112. If a host I/O write request 332 has not been received for more than a host I/O write request timeout period 908, then flow ends.

Referring now to FIG. 12, a flowchart illustrating a main process in accordance with embodiments of the present invention is shown. The process illustrated continues from decision block 1112 of FIG. 11. Flow begins at decision block 1204.

At decision block 1204, the storage controller 108 determines if a dirty watermark percentage 512 is greater than a dirty watermark maximum percentage 516. If the dirty watermark percentage 512 is greater than the dirty watermark maximum percentage 516, then flow proceeds to decision block 1208. If the dirty watermark percentage 512 is not greater than the dirty watermark maximum percentage 516, then flow ends.

At decision block 1208, the storage controller 108 determines if the current cache element 352 is efficient to destage. The current cache element 352 is identified by the current cache element pointer 820. Decision block 1208 is represented in more detail in the process of FIG. 13. If the current cache element 352 is efficient to destage, then flow proceeds to decision block 1216. If the current cache element 352 is not efficient to destage, then flow proceeds to block 1212.

At block 1212, the storage controller 108 identifies a better cache element 352 to destage from the write data cache 328. Block 1212 is represented in more detail in the process of FIG. 14. Flow proceeds to decision block 1216.

At decision block 1216, the storage controller 108 determines if the current data container 824 is full. The current data container 824 is the data container 612 including the cache element 352 identified by the current cache element pointer 820. A data container 612 is full if all cache elements 352 of the data container 612 are in the write data cache 328, and each of the cache elements 352 have a status of either dirty 620 or valid 624. If the current data container 824 is full, then flow proceeds to block 1220. If the current data container 824 is not full, then flow proceeds to blocks 1224 and 1228.

At block 1220, the storage controller 108 removes the full and current data container 824 from the destage stream 828. Flow proceeds to blocks 1224 and 1228.

At block 1224, the storage controller 108 destages the current data container 824 to the corresponding virtual disk 348 and increments the active destage count 920 for the corresponding virtual disk 348. Flow proceeds to block 1232.

At block 1228, the storage controller 108 removes the current data container 824 from the data container 612 list in the virtual disk metadata 320b. Flow proceeds to block 1232.

At block 1232, the storage controller 108 identifies the next dirty cache element 620, by LBA. The current CE pointer 820 is updated to reflect the identified next dirty cache element 620, and the current data container 824 may be a different data container 612 than previously. Flow proceeds to decision block 1236.

At decision block 1236, the storage controller 108 determines if the active destage count 920 for the corresponding virtual disk 348 is less than an actual destage count maximum value 912. If the active destage count 920 for the corresponding virtual disk 348 is less than the actual destage count maximum value 912, then flow proceeds to decision block 1204 of FIG. 12 to attempt to destage a next cache element 352. If the active destage count 920 for the corresponding virtual disk 348 is not less than the actual destage count maximum value 912, then flow ends.

Referring now to FIG. 13, a flowchart illustrating a process to determine if the current cache element 352 is efficient to destage in accordance with embodiments of the present invention is shown. The process illustrated in FIG. 13 corresponds to decision block 1208 of FIG. 12. Flow begins at decision block 1304.

At decision block 1304, the storage controller 108 determines if the current data container 824 is full. The current data container 824 is the data container 612 including the cache element 352 identified by the current cache element pointer 820. A data container 612 is full if all cache elements 352 of the data container 612 are in the write data cache 328, and each of the cache elements 352 have a status of either dirty 620 or valid 624. If the current data container 824 is full, then flow proceeds to block 1316. If the current data container 824 is not full, then flow proceeds to decision block 1308.

At decision block 1308, the storage controller 108 determines if the full stripe write percentage 724 for the corresponding virtual disk 348 is greater than a full stripe write affinity value 904. In another embodiment, the storage controller 108 determines if the full stripe write percentage 724 for the corresponding virtual disk 348 is greater than or equal to the full stripe write affinity value 904. The full stripe write affinity value 904 is the threshold at which the storage controller 108 will opt to only issue full stripe writes from the write data cache 328. This value is best determined by empirical testing, and depends on the frequency and locality of reference of host I/O write requests 332, the size of the write data cache 328, and the time required to destage partial or full stripes 604 from the write data cache 328. In the preferred embodiment, the full stripe write affinity value 904 is 50%. In another embodiment, the full stripe write affinity value 904 is 60%. However, in other embodiments, the full stripe write affinity value 904 is different than either 50% or 60%. If the full stripe write percentage 724 for the current virtual disk 348 is greater than or equal to the full stripe write affinity value 904, then flow proceeds to block 1312. If the full stripe write percentage 724 is not greater than or equal to the full stripe write affinity value 904, then flow proceeds to block 1316.

At block 1312, the storage controller 108 identifies the current cache element 352 as not efficient to destage. The current cache element 352 is the cache element 352 identified by the current CE pointer 820. Flow ends at block 1312, thus returning control to block 1212 of FIG. 12.

At block 1316, the storage controller 108 identifies the current cache element 352 as efficient to destage. Flow ends at block 1316, thus returning control to decision block 1216 of FIG. 12.

Referring now to FIG. 14, a flowchart illustrating a process to identify a better cache element 352 to destage in accordance with embodiments of the present invention is shown. The process illustrated in FIG. 14 corresponds to block 1212 of FIG. 12. Flow begins at blocks 1404.

At block 1404, the storage controller 108 determines the destage stream gradient 840. The destage stream gradient 840 is the difference between the largest destage stream object 836 and the smallest destage stream object 832. The process to determine the destage stream gradient 840 is shown in more detail with respect to FIG. 15. Flow proceeds to decision block 1408.

At decision block 1408, the storage controller 108 determines if the destage stream gradient 840 is greater than a destage stream gradient threshold 916. If the destage stream gradient 840 is greater than the destage stream gradient threshold 916, then flow proceeds to block 1412. If the destage stream gradient 840 is not greater than the destage stream gradient threshold 916, then flow proceeds to decision block 1420.

At block 1412, the storage controller 108 identified the largest destage stream object 836. The largest destage stream object 836 is the destage stream object 828 containing the greatest number of cache elements 352. In the example of FIG. 8, the largest destage stream object 836 has 15 cache elements 352. Flow proceeds to block 1416.

At block 1416, the storage controller 108 identifies the cache element 352 in the largest destage stream object 836 with the lowest logical block address (LBA) as the better cache element 352 to destage. In the example of FIG. 8, the better cache element would therefore be the leftmost cache element 352 of the largest destage stream object 836, or the leftmost cache element of data container E 612. Flow ends at block 1416, returning control to decision block 1216 of FIG. 12.

At decision block 1420, the storage controller 108 determines if the full stripe write percentage 724 for the corresponding virtual disk 348 is greater than a full stripe write affinity value 904. In another embodiment, the storage controller 108 determines if the full stripe write percentage 724 for the corresponding virtual disk 348 is greater than or equal to the full stripe write affinity value 904. The full stripe write affinity value 904 is the threshold at which the storage controller 108 will opt to only issue full stripe writes from the write data cache 328. This value is best determined by empirical testing, and depends on the frequency and locality of reference of host I/O write requests 332, the size of the write data cache 328, and the time required to destage partial or full stripes 604 from the write data cache 328. In the preferred embodiment, the full stripe write affinity value 904 is 50%. In another embodiment, the full stripe write affinity value 904 is 60%. However, in other embodiments, the full stripe write affinity value 904 is different than either 50% or 60%. If the full stripe write percentage 724 for the current virtual disk 348 is greater than or equal to the full stripe write affinity value 904, then flow proceeds to block 1428. If the full stripe write percentage 724 is not greater than or equal to the full stripe write affinity value 904, then flow proceeds to block 1424.

At block 1424, the storage controller 108 identifies the current cache element 352 as the better cache element 352 to destage. The current cache element 352 is identified by the current cache element pointer 820. Flow ends at block 1424, returning control to decision block 1216 of FIG. 12.

At block 1428, the storage controller 108 identifies the next full data container 612, by logical block address (LBA). The next full data container 612 is the data container 612 in the destage stream 828 with the next highest starting logical block address (LBA). Flow proceeds to block 1432.

At block 1432, the storage controller 108 identifies the cache element 352 with the lowest logical block address in the next full data container 612 as the better cache element 352 to destage. The storage controller 108 changes the current cache element pointer 820 to point to the cache element 352 with the lowest logical block address in the next full data container 612. Flow ends at block 1432, returning control to decision block 1216 of FIG. 12.

Referring now to FIG. 15, a flowchart illustrating a process to determine the destage stream gradient 840 for the corresponding virtual disk 348 in accordance with embodiments of the present invention is shown. The steps of FIG. 15 correspond to block 1404 of FIG. 14. Flow begins at block 1504.

At block 1504, the storage controller 108 identifies the largest destage stream object 836 in the destage stream 828. In the example of FIG. 8, this would be the destage stream object 828 containing 15 cache elements (CEs) 352. Flow proceeds to block 1508.

At block 1508, the storage controller 108 identifies the smallest destage stream object 832 in the destage stream 828. In the example of FIG. 8, this would be the destage stream object 828 containing five cache elements (CEs) 352. Flow proceeds to block 1512.

At block 1512, the storage controller 108 subtracts the smallest destage stream object 832 from the largest destage stream object 836 to obtain the destage stream gradient 840. In the example of FIG. 8, the destage stream gradient 840 for the corresponding virtual disk 348 is 15-5 or 10 cache elements 352. Flow ends at block 1512, therefore returning control to decision block 1408 of FIG. 14.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for efficiently destaging write data from a storage controller to storage devices, comprising:
    determining, by the storage controller, that a cache element should be transferred from a write cache of the storage controller to the storage devices, wherein cache elements are fixed size portions of the write cache;
    calculating, by the storage controller, that a dirty watermark is above a dirty watermark maximum value, wherein the dirty watermark identifies the amount of dirty data in the write cache, wherein dirty data is data in the write cache that has not yet been written to storage devices;
    identifying, by the storage controller, a first cache element to destage from the write cache to the storage devices;
    transferring, by the storage controller, a first data container comprising the first cache element from the write cache to the storage devices;
    incrementing, by the storage controller, an active destage count, wherein the active destage count is a current number of host write requests issued to a virtual disk that have not yet been completed, wherein the virtual disk is a RAID group comprising one or more specific storage devices; and
    repeating determining, calculating, identifying, transferring, and incrementing, by the storage controller, if the active destage count is less than an active destage count maximum value.

2. The method of claim 1, wherein if a destage stream comprises the first data container, the method further comprising:
    removing, by the storage controller, the first data container from the destage stream,
    wherein the destage stream and the first data container correspond to the virtual disk, wherein the destage stream comprises only full data containers, wherein a full data container comprises all of the cache elements in a stripe of the RAID group.

3. The method of claim 2, wherein the destage stream comprises the first data container, wherein the storage controller concatenates a plurality of full data containers to create the first data container if each full data container of the plurality of data containers have adjacent logical block addresses.

4. The method of claim 1, wherein determining that a cache element should be transferred from the write cache of the storage controller to the storage devices comprises one of:
    finishing, by the storage controller, destaging a stripe from the write cache to the storage devices and decrementing the active destage count;
    completing, by the storage controller, a host write request, wherein completing a host write request comprises writing the data corresponding to the host write request to the storage devices; and
    verifying, by the storage controller, that no host I/O requests have been received for less than a host I/O request timeout period, wherein host I/O requests comprises host write requests and host read requests;
    after completing one of finishing, completing, and verifying:
        determining, calculating, identifying, transferring, and incrementing, by the storage controller, only if the active destage count is less than the active destage count maximum value.

5. The method of claim 1, wherein identifying a first cache element to destage from the write cache to the storage devices comprises:
    determining, by the storage controller, if the first data container is full, wherein a full data container comprises all of the cache elements in a stripe, wherein a stripe comprises a plurality of cache elements with adjacent logical block addresses;
    if the first data container is not full, then:
        calculating, by the storage controller, if a full stripe write percentage is less than a full stripe write affinity value;
        if the full stripe write percentage is not less than the full stripe write affinity value, then:
            identifying, by the storage controller, a better cache element to destage; and
        if the full stripe write percentage is less than the full stripe write affinity value, then:
            identifying, by the storage controller, a current cache element as the first cache element, wherein a current cache element pointer identifies the current cache element and the first data container; and
    if the first data container is full, then:
        identifying, by the storage controller, the current cache element as the first cache element.

6. The method of claim 5, wherein the full stripe write percentage is the number of dirty cache elements belonging to full stripes of the virtual disk divided by the number of dirty cache elements of the virtual disk, wherein dirty cache elements are cache elements containing data that has not yet been written to the storage devices, wherein all data locations of a full stripe are represented in cache elements of the write cache, wherein the full stripe write affinity value identifies a threshold at which the storage controller will opt to only issue full stripe writes from the write cache, wherein the current stripe is one of a full stripe and a partial stripe.

7. The method of claim 6, wherein identifying a better cache element to destage comprises:
    calculating, by the storage controller, a destage stream gradient;
    determining, by the storage controller, if the destage stream gradient is greater than a destage stream gradient threshold, wherein the destage stream gradient threshold is a multiple of the virtual disk stripe size;

if the destage stream gradient is greater than the destage stream gradient threshold, then:
  identifying, by the storage controller, a largest destage stream object; and
  identifying, by the storage controller, a cache element in the largest destage stream object with the lowest logical block address within the largest destage stream object as the better cache element to destage;
if the destage stream gradient is not greater than the destage stream gradient threshold, then:
  calculating, by the storage controller, if the full stripe write percentage is less than the full stripe write affinity value;
  if the full stripe write percentage is not less than the full stripe write affinity value, then:
    identifying, by the storage controller, a next full data container, wherein the next full data container is the destage stream object with the second greatest size compared to the first data container; and
    identifying, by the storage controller, a cache element with the lowest logical block address in the next full data container as the better cache element to destage; and
  if the full stripe write percentage is less than the full stripe write affinity value, then:
    identifying, by the storage controller, the current cache element as the better cache element to destage.

8. The method of claim 7, wherein calculating the destage stream gradient comprises:
  identifying, by the storage controller, the largest destage stream for the virtual disk, wherein the destage stream comprises only full data containers;
  identifying, by the storage controller, a smallest destage stream object for the virtual disk; and
  subtracting, by the storage controller, the smallest destage stream object from the largest destage stream object to obtain the destage stream gradient.

9. The method of claim 8, wherein transferring a first data container comprising the first cache element from the write cache to the storage devices comprises:
  destaging, by the storage controller, the first data container from the write cache to the virtual disk;
  incrementing, by the storage controller, the active destage count; and
  removing the data container, by the storage controller, from a data container list, wherein the data container list comprises a status, a dirty cache element count, and a total cache element count for each active data container, wherein the status identifies if a data container is either full or partially full.

10. A storage controller for efficiently destaging write data to storage devices, comprising:
  a processor; and
  a memory, coupled to the processor, the memory comprising:
    a write cache, comprising:
      a plurality of cache elements, wherein cache elements are fixed size portions of the write cache;
    wherein the storage controller determines that a cache element should be transferred from the write cache to the storage devices, calculates that a dirty watermark is above a dirty watermark maximum value, identifies a first cache element to destage from the write cache to the storage devices, transfers a first data container comprising the first cache element from the write cache to the storage devices, increments an active destage count, and repeats determines, calculates, identifies, transfers, and increments, if the active destage count is less than an active destage count maximum value,
    wherein the dirty watermark identifies the amount of dirty data in the write cache, wherein dirty data is data in the write cache that has not yet been written to storage devices, wherein the active destage count is a current number of data containers issued to a virtual disk that have not yet been completed, wherein the virtual disk is a RAID group comprising one or more specific storage devices.

11. The storage controller of claim 10, wherein the storage controller determines that the cache element should be transferred from the write cache of the storage controller to the storage devices comprises one of:
  the storage controller finishes destaging a destage stream object from the write cache to the storage devices and decrements the active destage count, wherein destage stream objects are full data containers; and
  the storage controller completes a host write request, wherein the storage controller completes a host write request comprises the storage controller writes the data corresponding to the host write request to the storage devices; and
  the storage controller verifies that a host I/O request has been received for more than a host I/O request timeout period;
after completing one of finishes, completes, and verifies:
  the storage controller determines, calculates, identifies, transfers, and increments only if the active destage count is less than the active destage count maximum value.

12. The storage controller of claim 10, wherein the storage controller identifies a first cache element to destage from the write cache to the storage devices comprises:
  the storage controller determines if the first data container is full, wherein a full data container comprises all of the cache elements in a stripe, wherein a stripe comprises a plurality of cache elements with adjacent logical block addresses;
  if the first data container is not full, then:
    the storage controller calculates if a full stripe write percentage is less than a full stripe write affinity value;
    if the full stripe write percentage is not less than the full stripe write affinity value, then:
      the storage controller identifies a better cache element to destage; and
    if the full stripe write percentage is less than the full stripe write affinity value, then:
      the storage controller identifies a current cache element as the first cache element, wherein a current cache element pointer identifies the current cache element and the first data container; and
  if the first data container is full, then:
    the storage controller identifies the current cache element as the first cache element.

13. The storage controller of claim 12, wherein the full stripe write percentage is the number of dirty cache elements belonging to full stripes of the virtual disk divided by the number of dirty cache elements of the virtual disk, wherein dirty cache elements are cache elements containing data that has not yet been written to the storage devices, wherein all data locations of a full stripe are represented in cache elements of the write cache, wherein the full stripe write affinity value identifies a threshold at which the storage controller will opt to only issue full stripe writes from the write cache.

14. The storage controller of claim 13, wherein the storage controller identifies a better cache element to destage comprises:
  the storage controller calculates a destage stream gradient;
  the storage controller determines if the destage stream gradient is greater than a destage stream gradient threshold, wherein the destage stream gradient threshold is a multiple of the virtual disk stripe size;
  if the destage stream gradient is greater than the destage stream gradient threshold, then:
    the storage controller identifies a largest destage stream object; and
    the storage controller identifies a cache element in the largest destage stream object with the lowest logical block address within the largest destage stream object as the better cache element to destage;
  if the destage stream gradient is not greater than the destage stream gradient threshold, then:
    the storage controller calculates if the full stripe write percentage is less than the full stripe write affinity value;
    if the full stripe write percentage is not less than the full stripe write affinity value, then:
      the storage controller identifies a next full data container, wherein the next full data container is the destage stream object with the second greatest size compared to the first data container; and
      the storage controller identifies a cache element with the lowest logical block address in the next full data container as the better cache element to destage; and
    if the full stripe write percentage is less than the full stripe write affinity value, then:
      the storage controller identifies the current cache element as the better cache element to destage.

15. The storage controller of claim 14, wherein the storage controller calculates the destage stream gradient comprises:
  the storage controller identifies the largest destage stream object in a destage stream, wherein the destage stream comprises only full data containers;
  the storage controller identifies a smallest destage stream object in the destage stream; and
  the storage controller subtracts the smallest destage stream object from the largest destage stream object to obtain the destage stream gradient.

16. The storage controller of claim 15, wherein the storage controller transfers a first data container comprising the first cache element from the write cache to the storage devices comprises:
  the storage controller destages the first data container from the write cache to the virtual disk;
  the storage controller increments the active destage count; and
  the storage controller removes the data container from a data container list,
  wherein the data container list comprises a status, a dirty cache element count, and a total cache element count for each active data container, wherein the status identifies if a data container is either full or partially full.

17. A system for efficiently transferring write data to storage devices, comprising:
  a host computer;
  a storage controller, coupled to the host computer, comprising:
    a processor; and
    memory, coupled to the processor, comprising:
      a write cache, comprising:
        a plurality of cache elements, wherein cache elements are fixed size portions of the write cache, wherein each cache element of the plurality of cache elements corresponds to an active data container; and
    a virtual disk comprising one or more storage devices, coupled to the storage controller wherein the virtual disk is a RAID group comprising one or more specific storage devices of the one or more storage devices,
  wherein the host computer transfers a write request to the storage controller, wherein in response to receiving the write request, the storage controller stores write data corresponding to the write request in the plurality of cache elements,
  wherein the storage controller determines that a cache element should be transferred from the write cache to the virtual disk, calculates that a dirty watermark is above a dirty watermark maximum value, identifies a first cache element to destage from the write cache to the virtual disk, transfers a data container comprising the first cache element from the write cache to the virtual disk, increments an active destage count, and repeats determines, calculates, identifies, transfers, and increments, if the active destage count is less than an active destage count maximum value,
  wherein the dirty watermark identifies the amount of dirty data in the write cache, wherein dirty data is data in the write cache that has not yet been written to storage devices, wherein the active destage count is a current number of write requests issued to the virtual disk that have not yet been completed.

18. The system of claim 17, wherein the storage controller identifies the first cache element to destage from the write cache to the virtual disk comprises:
  the storage controller determines if the data container is full, wherein a full data container comprises all of the cache elements in a stripe, wherein a stripe comprises a plurality of cache elements with adjacent logical block addresses;
  if the data container is not full, then:
    the storage controller calculates if a full stripe write percentage is less than a full stripe write affinity value, wherein the full stripe write percentage is the number of dirty cache elements belonging to full stripes of the virtual disk divided by the number of dirty cache elements of the virtual disk, wherein dirty cache elements are cache elements containing data that has not yet been written to the storage devices, wherein all data locations of a full stripe are represented in cache elements of the write cache, wherein the full stripe write affinity value reflects a threshold at which the storage controller will opt to only issue full stripe writes from the write cache;
    if the full stripe write percentage is not less than the full stripe write affinity value, then:
      the storage controller identifies a better cache element to destage; and
    if the full stripe write percentage is less than the full stripe write affinity value, then:
      the storage controller identifies a current cache element as the first cache element, wherein a current cache element pointer identifies the current cache element and the data container; and
  if the first data container is full, then:
    the storage controller identifies the current cache element as the first cache element.

19. The system of claim 18, wherein the storage controller identifies the better cache element to destage comprises:
- the storage controller calculates a destage stream gradient, wherein the storage controller calculates the destage stream gradient comprises:
  - the storage controller identifies the largest destage stream object in a destage stream, wherein the destage stream comprises only full data containers;
  - the storage controller identifies a smallest destage stream object in the destage stream; and
  - the storage controller subtracts the smallest destage stream object from the largest destage stream object to obtain the destage stream gradient;
- the storage controller determines if the destage stream gradient is greater than a destage stream gradient threshold, wherein the destage stream gradient threshold is a multiple of the virtual disk stripe size;
- if the destage stream gradient is greater than the destage stream gradient threshold, then:
  - the storage controller identifies a largest destage stream object; and
  - the storage controller identifies a cache element in the largest destage stream object with the lowest logical block address within the largest destage stream object as the better cache element to destage;
- if the destage stream gradient is not greater than the destage stream gradient threshold, then:
  - the storage controller calculates if the full stripe write percentage is less than the full stripe write affinity value;
- if the full stripe write percentage is not less than the full stripe write affinity value, then:
  - the storage controller identifies a next full data container, wherein the next full data container is the destage stream object with the second greatest size compared to the first data container; and
  - the storage controller identifies a cache element with the lowest logical block address in the next full data container as the better cache element to destage; and
- if the full stripe write percentage is less than the full stripe write affinity value, then:
  - the storage controller identifies the current cache element as the better cache element to destage.

20. The system of claim 17, wherein the storage controller transfers the data container comprising the first cache element from the write cache to the virtual disk comprises:
- the storage controller destages the data container from the write cache to the virtual disk;
- the storage controller increments the active destage count; and
- the storage controller removes the data container from a data container list,
- wherein the data container list comprises a status, a dirty cache element count, and a total cache element count for each active data container, wherein the status identifies if a data container is either full or partially full.

* * * * *